United States Patent [19]

Gourley

[11] Patent Number: 4,552,952
[45] Date of Patent: Nov. 12, 1985

[54] DISPERSE AND ACID AZO DYES HAVING ONE OR TWO CINNAMOYL SUBSTITUENTS ON A BENZOTHIAZOLE OR BENZOISOTHIAZOLE DIAZONIUM MOIETY AND HAVING AN ANILINE, TETRAHYDROQUINOLINE OR BENZOMORPHOLINE TYPE COUPLER

[75] Inventor: Robert N. Gourley, Formby, England

[73] Assignee: Eastman Kodak Company, Rochester, N.Y.

[21] Appl. No.: 573,241

[22] Filed: Jan. 23, 1984

[30] Foreign Application Priority Data

Oct. 7, 1983 [GB] United Kingdom ............... 8326868

[51] Int. Cl.$^4$ ................. C09B 29/039; C09B 29/045; C09B 29/09; C09B 29/36
[52] U.S. Cl. ..................... 534/782; 260/508; 534/565; 534/588; 534/594; 534/728; 534/768; 534/788
[58] Field of Search .............. 260/158, 155, 152; 534/728, 768, 782, 788

[56] References Cited

U.S. PATENT DOCUMENTS

| | | | |
|---|---|---|---|
| 2,805,218 | 9/1957 | Towne et al. | 260/152 |
| 2,827,450 | 3/1958 | Towne et al. | 260/152 |
| 3,329,669 | 7/1967 | Sartori | 260/152 |
| 3,441,554 | 4/1969 | Hahn et al. | 260/152 |
| 4,101,543 | 7/1978 | Stiot et al. | 260/152 |
| 4,255,326 | 3/1981 | Giles et al. | 260/152 |
| 4,282,144 | 8/1981 | Weaver et al. | 260/152 |
| 4,400,318 | 8/1983 | Weaver et al. | 260/152 |
| 4,459,229 | 7/1984 | Weaver et al. | 260/152 |

FOREIGN PATENT DOCUMENTS

| | | | |
|---|---|---|---|
| 560335 | 7/1958 | Canada | 260/152 |
| 1351381 | 4/1974 | United Kingdom | 260/152 |
| 1351382 | 4/1974 | United Kingdom | 260/152 |
| 2041961 | 9/1980 | United Kingdom | 260/152 |

*Primary Examiner*—Floyd D. Higel
*Attorney, Agent, or Firm*—Donald W. Spurrell; Daniel B. Reece, III

[57] ABSTRACT

This invention relates to azo dyes which may be unsubstituted or substituted with a variety of groups known to the dye art, and containing diazonium moieties from 2-aminobenzothiazole or 2-aminobenzisothiazole type compounds, and certain coupler moieties from aniline, tetrahydroquinoline, or benzomorpholine compounds, wherein the diazonium moieties have one or two cinnamoyl substituents, and wherein one or more water-solubilizing groups such as a sulfonic acid group or its metal or amine salt may be present as a substituent in the dye molecule for acid dyeing. These dyes are particularly useful in dyeing one or more of polyamide cellulose acetate polyester, wool and other fibers.

8 Claims, No Drawings

DISPERSE AND ACID AZO DYES HAVING ONE OR TWO CINNAMOYL SUBSTITUENTS ON A BENZOTHIAZOLE OR BENZOISOTHIAZOLE DIAZONIUM MOIETY AND HAVING AN ANILINE, TETRAHYDROQUINOLINE OR BENZOMORPHOLINE TYPE COUPLER

This invention relates to azo dyes containing diazonium moieties from 2-aminobenzothiazole or 3-aminobenzisothiazole type compounds, and certain coupler moieties from aniline, tetrahydroquinoline, and benzomorpholine type compounds, wherein the diazonium moieties have one or two cinnamoyl groups, and wherein a wide variety of groups, e.g., one or more water-solubilizing substituents such as sulfonic acid groups or their metal or amine salts may be present in the dye molecule. These dyes are useful for dyeing materials selected from polyamide, cellulose ester, polyester, wool and other natural and synthetic fibers and generally exhibit improvements in dyeability and fastness properties.

The present dyes have the general structure:

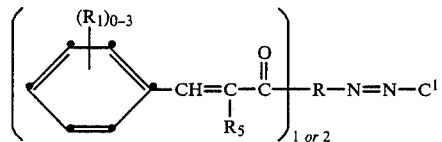

wherein $C^1$ is an aniline, tetrahydroquinoline, or benzomorpholine type coupler which may be substituted; R is a divalent radical of benzothiazole or 2,1-benzisothiazole in accordance with one of the formulae below, which radical is unsubstituted or substituted in any positions not occupied by a cinnamoyl group, with 1–3 substituents preferably each of which is a substituent as defined for $R^1$; $R_5$ is H or alkyl; each $R_1$ is preferably alkyl, alkenyl of 2–6 carbons, aryl, cyclohexyl, alkoxy, halogen, hydroxy, alkylsulfonyl, cyano, carbamoyl, alkanoyl, alkanoyloxy, aroyl, alkoxycarbonyl, sulfamoyl, alkylsulfamoyl, dialkylsulfamoyl, alkanoylamino, $SO_3C_6H_5$, amino alkylthio, thiocyano, arylsulfonyl, formyl, alkylcarbamoyl, dialkylcarbamoyl, $NO_2$, $-SO_3M$, $-OSO_3M$, $-COOH$, aryloxy, arylthio, alkylsulfonylamino, aroylamino, arylsulfonylamino, or cyclohexylthio, wherein the alkyl, alkenyl aryl, and cyclohexyl moieties of the above $R_1$ groups, e.g., the alkyl portions of the alkanoyl groups, are unsubstituted or substituted with 1–3 substituents different from the said moieties and independently selected from alkanoyloxy, alkyl, alkenyl, succinimido ($C_4H_4O_2N$), $-NO_2$, alkanoylamino, alkylsulfonylamino, 1-(2-pyrrolidono) ($C_4H_6ON$), halogen, cyano, alkoxy, aryl, cyclohexyl, hydroxy, $-SO_3M$, $-OSO_3M$, aryloxy, furyl ($C_4H_3O$), aroyloxy, alkoxycarbonyl, $-SO_2N-$ (alkyl)$_2$, $-NH-COO-$alkyl, $-NHCONH-$alkyl, glutarimido ($C_5H_6O_2N$), phthalimido ($C_8H_4O_2N$), $CONH_2$, CONH-alkyl, CON(alkyl)$_2$, alkoxyalkoxy, alkylthio, arylthio, alkylsulfonyl, and arylsulfonyl, wherein M is selected from $H^+$, $NH_4^+$, $Na^+$, $K^+$, and the colorless cations of salts of primary, secondary, and tertiary aliphatic and arylamines, such as triethylamine, tri(2-hydroxyethyl)amine, di(2-hydroxyethyl)amine, N,N-dimethylaniline, and especially trimethylamine.

More particularly the R radical in the above dyes is selected from

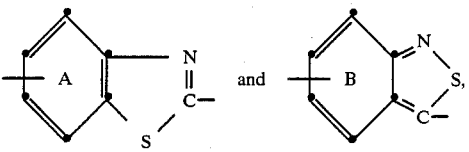

wherein each ring A and B carries 1 or 2 cinnamoyl groups defined above and is unsubstituted or substituted with 1–3 independently selected $R_1$ substituents.

The couplers $C^1$ preferably have the formulae:

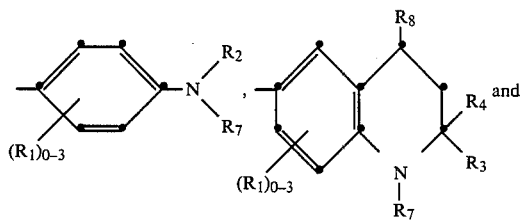

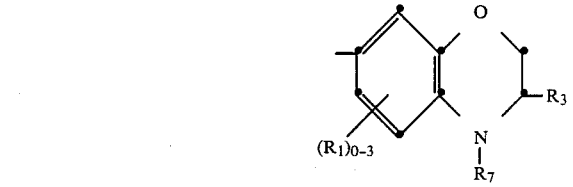

wherein $R_1$ is defined above; $R_2$ and $R_7$ are each selected independently from hydrogen, alkyl, alkenyl of 2–6 carbons, aryl, and cyclohexyl, all of which groups including alkylene moieties are unsubstituted or substituted as defined above for the substituted $R_1$ groups; and $R_3$, $R_4$ and $R_8$ are each selected from hydrogen and alkyl.

The various alkyl and alkylene moieties such as contained, for example, in alkoxy, alkanoyl, and alkoxyalkoxy groups within the above definitions, preferably contain 1–6 carbons, and they and the alkenyl groups may be straight or branched chain, and the above aryl groups preferably contain from 6–10 ring carbons The following are typical specific $R_1$ groups: $CH_3$, Cl, $SO_2C_2H_5$, CN, $CONH_2$, $COC_2H_5$, $COC_6H_5$, $COOC_2H_5$, $SO_2NH_2$, $SO_2NHCH_3$, $SO_2N(C_2H_5)_2$, $NHCOC_2H_5$, $SO_3C_6H_5$, $SCH_3$, SCN, $SO_2C_6H_5$, CHO, $CONHC_2H_5$, $CON(C_2H_5)_2$, OH, $NO_2$, $C_6H_5$, $C_6H_{11}$, $SO_3K$, $CF_3$, $CH_2OOCC_2H_5$, Br, $SO_2CH_2CH_2OC_2H_5$, I, $CONHCH_2CN$, $COCH_2CH_2OH$, $COC_6H_3$-o-$CH_3$-p-$OCH_3$, $COOC_2H_4$-CH=$CH_2$, $SO_2NHCH_2CH_2CN$, $SO_2NHCH_2$- succinimido, $SO_2NHC_2H_4$-$C_6H_5$, $NHCOCH_2Cl$, $SO_3C_6H_4$-p-$NO_2$, $SCH_2CH_2OH$, $SC_2H_4$-$C_6H_{11}$, $SO_2C_6H_4$-p-$NHCOCH_3$, $C_6H_4$-p-$NHSO_2CH_3$, $CONHC_2H_4NHSO_2CH_3$, $CONHCH_2C$-$H_2OH$, $CH_2CH_2NO_2$, $C_6H_4$-p-(2-pyrrolidono), $C_6H_{10}$-4-CN, $OSO_3K$, $CH_2SO_3Na$, $OC_6H_5$, $SO_2C_2H_4OSO_3K$, $C_2H_4$-furyl, $C_2H_4OOCC_6H_5$, $COCH_2CH_2COOCH_3$, $COC_6H_4$-p-$SO_2NHC_6H_5$, $COOCH_2CH_2$-$SO_2NHCH_3$, $SO_2NHCH_2SO_2N(C_2H_5)_2$, $SO_2NHCH_2NHCOOCH_3$, $SO_2NHC_2H_4NHCONHCH_3$, $NHCOCH_2CH_2$-glutarimido, $SO_3C_6H_4$-p-phthalimido, $SCH_2CONH_2$, $C_6H_4$-p-$SO_2CH_3$, $SO_2C_6H_4$-p- $CONHCH_2SO_3Na$, $CH_2SO_2C_6H_5$, $CONHCH_2CH_2CON(CH_3)_2$, CONHCH$_2$CH$_2$OCH$_2$CH$_2$OCH$_2$CH$_3$, CH$_2$CH$_2$SO$_3$H, C$_6$H$_4$-p-SC$_2$H$_5$, C$_6$H$_{10}$-4-SC$_6$H$_4$(4-OSO$_3$H), CH$_2$CH=CH$_2$, COOH, OC$_6$H$_5$, OCH$_3$, SC$_6$H$_5$, NHSO$_2$CH$_3$, NHCOC$_6$H$_5$, NH$_2$, NHSO$_2$C$_6$H$_5$, SC$_6$H$_{11}$, and -OOCCH$_3$.

Typical for R$_3$, R$_4$, R$_5$ and R$_8$ are: H, CH$_3$, C$_2$H$_5$, C$_4$H$_9$-n, and CH$_2$(CH$_3$)$_2$.

The following are typical specific R$_2$ and R$_7$ substituents: H, CH$_3$, C$_2$H$_5$, C$_4$H$_9$-n, CH$_2$CH=CH$_2$, C$_6$H$_5$, C$_6$H$_{11}$, CH$_2$OOCC$_2$H$_5$, CH$_2$CH$_2$OC$_2$H$_5$, CH$_2$CN, CH$_2$CH$_2$OH, C$_6$H$_3$-o-CH$_3$-p-OCH$_3$, C$_2$H$_4$-CH=CH$_2$, CH$_2$-succinimido, CH$_2$CH$_2$-C$_6$H$_5$, CH$_2$CH$_2$Cl, C$_6$H$_4$-p-NO$_2$, CH$_2$CH$_2$C$_6$H$_{11}$, C$_6$H$_4$-p-NHSO$_2$CH$_3$, C$_2$H$_4$NHSO$_2$CH$_3$, CH$_2$CH$_2$NO$_2$, C$_6$H$_4$-p-(2-pyrrolidono), C$_6$H$_{10}$-4-CN, CH$_2$SO$_3$Na, CH$_2$CH$_2$OSO$_3$K, CH$_2$CH$_2$-furyl, CH$_2$CH$_2$OOCC$_6$H$_5$, CH$_2$CH$_2$COOCH$_3$, C$_6$H$_5$-p-SO$_2$NHC$_6$H$_5$, CH$_2$CH$_2$SO$_2$NHCH$_3$, CH$_2$SO$_2$N(C$_2$H$_5$)$_2$, CH$_2$NHCOOCH$_3$, CH$_2$CH$_2$NHCONHCH$_3$, CH$_2$CH$_2$-glutarimido, C$_6$H$_4$-p-phthalimido, CH$_2$CONH$_2$, C$_6$H$_4$-p-SO$_2$CH$_3$, C$_6$H$_4$-p-CONHCH$_2$SO$_3$Na, CH$_2$SO$_2$C$_6$H$_5$, CH$_2$CH$_2$CON(CH$_3$)$_2$, CH$_2$CH$_2$OCH$_2$CH$_2$OC$_2$H$_5$, CH$_2$CH$_2$SO$_3$H, C$_6$H$_4$-p-SC$_2$H$_5$, and C$_6$H$_{10}$-4-SC$_6$H$_4$(p-OSO$_3$H).

Preferred for the A and B rings are R$_1$ being H, methoxycarbonyl, β-hydroxyethylcarbamoyl, halogen CF$_3$, CN, alkanoyl, NO$_2$, alkylsulphonyl β-potassiosulfatoethylcarbamoyl, methylcarbamoyl, carbamoyl, ethoxycarbonyl, or methyl; for R$_1$ on the cinnamoyl rings are H, alkyl, aralkyl, aralkyl substituted with —SO$_3$M or —SO$_4$, cyclohexylalkyl, cyclohexylalkyl substituted with —SO$_3$M or —SO$_4$M, alkoxy, or alkanoylamino; for R$_2$ are H, alkyl, aralkyl, alkyl or aralkyl substituted with —SO$_3$M or —SO$_4$M, cyclohexylalkyl, cyclohexylalkyl substituted with —SO$_3$M or —SO$_4$M; for R$_7$ are H, alkyl, aralkyl, aralkyl substituted with —SO$_3$M or —SO$_4$M, cyclohexylalkyl, cyclohexylalkyl substituted with —SO$_3$M or —SO$_4$M, sodio- or potassiosulfatoalkyl, sodio- or potassiosulfonicalkyl, or alkanoyloxyalkyl; for R$_1$ on the couplers are H, aralkyl, aralkyl substituted with —SO$_3$M or —SO$_4$M, alkanoylamino, aroylamino, cyclohexylalkyl, cyclohexylalkyl substituted with —SO$_3$M or —SO$_4$M, —SO$_3$Na, —SO$_3$K, halogen, —SO$_4$Na, —SO$_4$K, alkyl, alkoxy, —COOH, or —OH; for R$_3$, R$_4$ and R$_8$ are H and alkyl; and for R$_5$ is hydrogen.

The dyes of this invention impart red to blue shades on natural and synthetic fibers and exhibit improvements over such dyes as disclosed in U.S. Pat. No. 2,805,218 and British Pat. No. 1,021,399 in one or more properties such as fastness to light, ozone, chlorine, oxides of nitrogen, washing, sublimation, heat disintegration, perspiration, and crocking, leveling, transfer, exhaustion, build, pH stability, and resistance to blooming.

The intermediate compounds used in this invention are prepared according to procedures well known to the art. The present dyes are readily prepared, for example, by reacting the acetyl group of the intermediate azo compound, which itself is a dye, with benzaldehyde or a substituted benzaldehyde in acetic acid with concentrated sulphuric acid as catalyst. The acetyl dye is thus converted to a cinnamoyl substituted dye in high yield. The water-solubilizing group may be the substituent on the benzaldehyde or it may be introduced into the cinnamoyl dye at a later stage by known methods. For example, a hydroxy group in either the diazonium component or the coupling component could be reacted with sulphuric acid and then with MOH to give the —OSO$_3$M group. Alternatively a chloroalkyl group in the dye could be reacted with K$_2$SO$_3$ to give the —CH$_2$SO$_3$K group. Also, sulphonation of an aromatic ring or other reactive group in the dye with a sulphonating agent such as H$_2$SO$_4$or Cl—SO$_3$H would give the solubilizing group. Such groups could also be present in the coupling component prior to diazotisation and coupling.

The following Preparations, Example and tables will illustrate the making and use of intermediates for the synthesis of dyes of the present invention.

PREPARATION A

α-(N-Ethylanilino)-Toluenesulfonic Acid

To 30.0 g. of 100% sulfuric acid is added N-benzyl-N-ethylaniline (30.0 g.) dropwise below about 50° C. To this solution is added, at 50°–60° C., 60% oleum (30.0 g.) with good stirring. The mixture is stirred and heated at about 60° C. for three hours and then drowned into 200 ml. of water. The free sulfonic acid (Coupler 1) which is mostly the meta isomer with a small amount of para, precipitates on standing and is collected by filtration, washed with water, and dried. N-Benzylanilines containing groups such as alkyl, alkoxy, and halogen in the ortho, meta, or para positions of the benzyl group may also be sulfonated by this procedure. The exact location of the sulfonic acid group in these cases is often not known and mixtures usually are produced.

Aromatic amines which contain N-aralkyl groups and which are sulfonated by the above procedure to give Couplers 2 to 11 are listed below.

| COUPLER NO. | Sulfonation product of: |
|---|---|
| 2 | N—Benzyl-N—ethyl-m-toluidine; |
| 3 | N—Benzyl-2,7-dimethyl-1,2,3,4-tetrahydroquinoline; |
| 4 | N—Benzyl-2,3-dihydro-3,6-dimethyl-1,4-benzoxazine; |
| 5 | N—Methyl-N—(2-phenylethyl)aniline; |
| 6 | N—Ethyl-N—(4-phenylbutyl)-3-chloroaniline; |
| 7 | N,N—Dibenzylaniline; |
| 8 | N—Benzyl-2,5-dimethylaniline; |
| 9 | N—Benzyl-2-methoxy-5-methylaniline; |
| 10 | N—Benzyl-2-methoxy-5-chloroaniline; and |
| 11 | N—Benzyl-N—cyclohexylaniline. |

PREPARATION B

Diazotization and Coupling of 2-Amino-6-Acetylbenzothiazole

To 150 g. of 60% acetic acid containing 10 g. of concentrated H$_2$SO$_4$ is added 0.055 m. of 2-amino-6-acetylbenzothiazole at room temperature. The solution is cooled to −5° C., and a solution of 3.6 g. NaNO$_2$ in 20 ml. of concentrated H$_2$SO$_4$ is added below 0° C. The reaction mixture is stirred at −5° to 0° C. for 1.5 hours. Each of the Couplers 1 to 11.0 (0.005 m.) listed is added to water, or a 0.005 mole aliquot of the coupler in dilute sulfuric acid is added to water, and cooled in an ice bath.

To each chilled coupler is added a 0.005 mole aliquot of the diazonium solution. The coupling mixture is treated with enough potassium acetate to neutralize the mineral acid. Water is added to the coupling mixture to a total volume of about 200 ml. and the dyes collected by filtration, washed with 10% KCl solution, and dried in air. The dyes usually are admixed with about an equal weight of $K_2SO_4$ and are used for dyeing without further purification to produce red shades on polyamides. These dyes are intermediates for the preparation of dyes of the present invention.

PREPARATION C

Diazotization and Coupling of 3-Amino-5-acetyl-2,1-benzisothiazole

To 25 ml. of concentrated $H_2SO_4$ is added 3.6 g. of $NaNO_2$ portionwise below 80° C. The solution is cooled and 50 ml. of 1:5 acid (1 part propionic, 5 parts acetic acid) is added below 20° C. The mixture is further cooled and 3-amino-5-acetyl-2,1-benzisothiazole 0.055 m. is added, followed by 50 ml. of 1:5 acid, all at 0°–5° C. The diazonium, after stirring at 0°–5° C. for 1 hr., is coupled to each of the Couplers 1–11 in a similar manner as above to produce violet to reddish blue dyes for polyamides.

PREPARATION D

Sulfonation of Dye Containing an N-(Aralkylamino) Group

The dye from 2-amino-5-acetyl-2,1-benzisothiazole and N-benzyl-N-ethylaniline (2.0 g.) is added portionwise to 15 ml. of concentrated $H_2SO_4$ over 20 min., allowing the temperature to rise to 30° C. The reaction mixture is then heated at 70° C., and when the reaction is completed as evidenced by thin-layer chromatography, the reaction mixture is drowned on ice-water mixture, and 50% NaOH is added until the pH is about 7. The dye is collected by filtration, washed with water, and dried in air. The dye has the structure

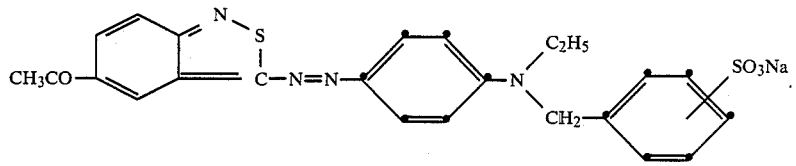

EXAMPLE

Final Dye Preparation

A mixture of compound (I) (2 g.), benzaldehyde (1.5 g.), acetic acid (25 ml.) and concentrated sulphuric acid (5 ml.) was stirred at 100° C. for 1.5 hours. The reaction mixture was poured into cold water and the produce dye (II) filtered off, washed with water and dried. Compound (I) had previously been prepared by diazotising the known 2-amino-6-acetylbenzothiazole and coupling with N,N-diethyl-m-toluidine by known procedures. The dye (II) when applied to nylon, polyester and other synthetic fibres by known techniques gives bright, bluish red shades with good dyeing and fastness properties.

By using the methods described hereinabove, the following dyes are obtained.

TABLE 1

[Structure: A diphenyl compound with cinnamoyl group on ring D (with R₁), connected via C(=O)-C(R₅)=CH- to ring A, which is fused with a thiazole (N=C-S) linked to ring C bearing R₁, and an -N(R₂)(R₇) group on ring C.]

| Cinnamoyl Group Position | R₁ on D | R₅ | Substituents on A | R₁ on C | R₂ | R₇ |
|---|---|---|---|---|---|---|
| 6 | H | H | H | H | H | H |
| 6 | 4-NO₂ | H | 4-COCH₃ | 2-CH₃ | $C_2H_5$ | Ph |
| 6 | 4-CN | H | 4-NO₂ | 5-COCH₃ | $C_2H_5$ | $C_6H_{11}$ |
| 6 | 5-COCH₃ | H | 4-Cl | 5-OCH₃ | $CH_2$—$C_6H_4$—p-SO₄K | $CH_2$—CH=CH₂ |
| 7 | 4-COPh | CH₃ | 4-CN | 5-SO₃Na | $CH_2$—$C_6H_4$—p-SO₄K | $CH_2OOC_2H_5$ |
| 5 | 2,4-di-COOH | CH₃ | 4-NHSO₂CH₃ | 5-OCH₂CH₂SO₄K | $CH_2$—$C_6H_{10}$—4-SO₃K | $C_6H_4$—p-OOCCH₃ |
| 6 | 4-OOCCH₃ | CH₃ | 7-CH₃ | 5-OCH₂CH₂SO₄NH(Et)₃ | H | $C_6H_{10}$—4-CH₃ |
| 5,6 | 4-NHCOCH₃ | CH₃ | 7-OCH₃ | 2-CH₃ | $CH_2$—$C_6H_4$—p-SO₄N H(Et)₃ | $CH_2CH_2(C_4H_4O_2N)$ |
| 6 | 4-NHCOPh | CH₃ | 4-Ph | 2-Ph | CH₃ | $CH_2CH_2NO_2$ |
| 4 | 4-C₂H₅ | H | H | 2-NO₂ | CH₃ | $C_6H_5$—p-NO₂ |
| 6 | 4-Ph | H | 4-SO₃Na | 2-OCH₃ | $C_2H_5$ | $CH_2NHOCCH_3$ |
| 5,6 | 2,5-di-Cl | H | 4-SO₃Na | 5-NHCOCH₃ | $C_2H_5$ | $CH_2NHSO_2CH_3$ |
| 6 | 2-Cl—4-SO₂CH₃ | H | 7-OCH₂CH₂SO₄K | 3-NHSO₂CH₃ | $C_2H_5$ | $C_6H_4$—p-NHOCCH₃ |
| 6 | 4-NHSO₂CH₃ | H | 7-OCH₂CH₂SO₄K | 3-COOCH₃ | $C_2H_5$ | $C_6H_4$—p-NHSO₂CH₃ |
| 6 | 4-COOCH₃ | H | 4-NHCOPh | 3-COOH | $C_2H_5$ | $C_6H_{10}$—4-NHOOCH₃ |
| 6 | 2-OCH₃ | $C_2H_5$ | 4-NHCOPh | 2-Cl | $CH_2CH_2Cl$ | $CH_2CH_2Cl$ |
| 5 | 4-OC₂H₅ | $C_2H_5$ | 7-NHCOCH₃ | 2,6-di-Br | $C_6H_4$—p-Br | $C_6H_4$—p-Br |
| 6 | 4-SO₃Na | $C_2H_5$ | 7-OOCC₂H₅ | 2-OCH₃—5-NHCOCH₃ | $C_6H_4$—p-CN | $C_6H_4$—p-CN |
| 6 | 2-SO₃Na | $C_2H_5$ | 4-COOH | 2-CH₂OOCCH₃ | $CH_2CH_2CN$ | $CH_2CH_2CN$ |
| 6 | 2-OCH₃—4-SO₃K | H | H | 2-CH₂Cl | $CH_2CH_2OC_2H_5$ | $CH_2CH_2OC_2H_5$ |
| 6 | 4-OCH₂CH₂OSO₃K | H | H | 2-CN | $CH_2CH_2OCH_2CH_2OC_2H_5$ | $CH_2CH_2OCH_2CH_2OC_2H_5$ |
| 7 | 2-SO₃Na—5-Cl | H | 7-SO₂CH₃ | 2-OOCCH₃ | $CH_2Ph$ | $CH_2$—$C_6H_4$—p-SO₄N H(Et)₃ |
| 6 | 4-Cl | $C_3H_7$—n | 7-CF₃ | 5-COOH | $CH_2C_6H_{11}$ | $CH_2$—$C_6H_{10}$—4-SO₃Na |
| 6 | 4-OH | $C_3H_7$—n | 7-COOCH₃ | 5-OH | H | $C_6H_4$—o-OH |
| 5,6 | 4-CH₂OOCCH₃ | H | 7-CHO | 5-CH₂CH=CH₂ | $C_2H_5$ | $CH_2CH_2OH$ |
| 6 | 4-SO₃K | H | 7-CONH₂ | 2-Cl | $CH_2CH_2$—SO₃K | $CH_2CH_2$—SO₃K |
| 6 | 4-OPh | H | 7-CONHCH₃ | 5-COCH₃ | H | $C_6H_4$—p-OSO₃K |
| 6 | 4-NO₂ | H | 7-CH₂Ph | 5-OCH₃ | H | $CH_2OPh$ |
| 6 | 5-CN | H | 7-CH₂SO₃K | 5-SO₃Na | $CH_2SO_2NHCH_3$ | $CH_2SO_2NHPh$ |
| 6 | 4-COCH₃ | H | 7-CH₂OSO₃K | 5-OCH₂CH₂SO₃K | H | $CH_2SO_2NHCH_3$ |
| 6 | 5-CH₃ | H | 7-C₆H₄—p-SO₃K | 5-OCH₂CH₂SO₃K | $CH_2COOCH_3$ | $CH_2$—$C_6H_4$—p-SO₂NHCH₃ |
| 6 | 5-C₆H₄—p-SO₃K | H | 7-CH₂CH₂OH | 2-CH₃ | H | $CH_2COOCH_3$ |
| 6 | 5-OCH₃ | H | 7-CH₂Cl | 2-C₆H₄—p-SO₃K | $C_2H_5$ | $CH_2SO_2N(CH_3)_2$ |
| 6 | 4,5-di-Br | $C_4H_9$—n | 7-C₆H₄—p-Br | 2-NO₂ | $C_2H_5$ | $C_6H_4$—p-NHCOCO₃ |
| 6 | 5-COOH | H | H | 2-OCH₃ | $C_2H_5$ | $CH_2CONH_2$ |
| | H | CH₃ | 4-NO₂ | 5-NHCOCH₃ | $CH_2CH_2SCH_3$ | $C_6H_4$—p-CONHCH₃ |
| 6 | 4-NO₂ | CH₃ | 4-Cl | 3-NHSO₂CH₃ | $CH_2CH_2SCH_3$ | $C_6H_4$—p-SCH₃ |
| 6 | 4-CN | CH₃ | 4-CN | 3-COOCH₃ | H | $CH_2CH_2SCH_3$ |
| 6 | 5-COCH₃ | CH₃ | 4-NHSO₂CH₃ | 3-COOH | $CH_2SO_2C_2H_5$ | $CH_2SO_2C_2H_5$ |
| 6 | 4-COPh | CH₃ | H | 2-Cl | H | $CH_2SO_2Ph$ |
| 6 | 2,4-di-COOH | CH₃ | | | | |

TABLE 1-continued

| Cinnamoyl Group Position | R₁ on D | R₅ | Substituents on A | R₁ on C | R₂ | R₇ |
|---|---|---|---|---|---|---|
| 6 | 4-OOCCH₃ | CH₃ | 7-CH₃ | 2,6-di-Br | H | CH₂CH₂OSO₃K |
| 6 | 4-NHCOCH₃ | CH₃ | 7-OCH₃ | 2,6-di-Br | H | C₆H₄—p-OSO₃K |
| 6 | 4-NHCOPh | CH₃ | 4-Ph | 2-OCH₃—5-NHCOCH₃ | H | CH₂(C₈H̄₄O₂N) |
| 5 | 4-CH₂CH=CH₂ | H | H | 3-NHCOCH₃ | C₂H₅ | C₂H₅ |
| 4,6 | H | CH₃ | H | 3-OCPh | C₂H₅ | C₂H₅ |
| 6 | 4-CONH₂ | H | 4-COCH₃ | 5-CH₂CONHCH₃ | H | H |
| 6 | 3-SO₂NH₂ | H | 4-NO₂ | 5-CH₂CON(CH₃)₂ | H | Ph |
| 6 | 4-SO₂NHCH₃ | CH₃ | 4-Cl | 5-CH₂CH₂OCH₂CH₂OC₂H₅ | CH₃ | C₆H₁₁ |
| 6 | 4-SO₂N(C₂H₅)₂ | CH₃ | 4-CN | 5-CH₂SC₂H₅ | H | CH₂—CH=CH₂ |
| 7 | 4-SO₃C₆H₅ | CH₃ | 4-NHSO₂CH₃ | 2-CH₂SC₆H₅ | H | CH₂OOCC₂H₅ |
| 5 | 4-SCH₃ | CH₃ | 7-NHCOCH₃ | 5-CH₂SO₂C₂H₅ | H | C₆H₄—p-NHOCCH₃ |
| 6 | 2,4-di-SCN | CH₃ | 7-OCH₃ | 5-CH₂SO₂C₆H₅ | H | C₆H₄—p-OOCCH₃ |
| 6 | 4-SO₂C₆H₅ | CH₃ | 4-Ph | 5-C₆H₃—o,p-di-CN | CH₃ | C₆H₁₀—4-CH₃ |
| 6 | 2-CHO—4-CN | CH₃ | H | 5-C₆H₂—o,m̄,p-tri-Cl | CH₃ | CH₂CH₂(C₄H₄O₂N) |
| 4 | 4-CONHC₂H₅ | CH₃ | H | 2,6-di-OSO₃N H(CH₃)₃ | CH₃ | C₆H₄—p-NO₂ |
| 6 | 4-CON(C₂H₅)₂ | H | H | 2,6-di-SO₃N H(CH₃)₃ | CH₃ | C₆H₄—p̄-NO₂ |
| 6 | 3-C₆H₁₁ | H | 4-SO₃Na | 2,6-di-OSO₃K | C₂H₅ | CH₂NHOCCH₃ |
| 6 | 3-SC₆H₅ | H | 4-SO₃Na | 2-SO₃N H(CH₃) | C₂H₅ | CH₂NHSO₂CH₃ |
| 6 | 4-NHSO₂C₆H₅ | H | 7-OCH₂CH₂SO₄K | 2-OSO₃N H(CH₃) | C₂H₅ | C₆H₄—p̄-NHOCCH₃ |
| 6 | 4-SC₆H₁₁ | H | 7-OCH₂CH₂SO₄K | 5-SC₆H₁₁ | C₂H₅ | C₆H₄—p̄-NHSO₂CH₃ |
| 6 | 4-C₆H₄—p-CH₃ | C₂H₅ | 4-NHCOPh | 5-C₆H₄—p-CH₃ | CH₂CH₂Cl | C₆H₁₀—4-NHOCCH₃ |
| 5 | 4-C₆H₄—p-CH₂CH=CH₂ | C₂H₅ | 4-NHCOPh | 5-C₆H₄—p̄-CH₂CH=CH₂ | C₆H₄—p-Br | CH₂CH₂Cl |
| 6 | 4-OCH₂CH₂NO₂ | C₂H₅ | 7-OCH₃ | 5-OCH₃CH₂NO₂ | C₆H₄—p̄-CN | C₆H₄—p-Br |
| 6 | 2-CH₂NHCOCH₃ | C₂H₅ | 7-NHCOCH₃ | 2-CH₂NHCOCH₃ | CH₂CH₂CN | C₆H₄—p̄-CN |
| 6 | 4-CH₂NHSO₂C₂H₅ | H | 7-OOCC₂H₅ | 5-CH₂NHSO₂C₂H₅ | CH₂CH₂OC₂H₅ | CH₂CH₂OC₂H₅ |
| 6,7 | 4-CH₂CH₂Cl | H | 4-COOH | 5-CH₂Cl | CH₂CH₂OCH₂CH₂OC₂H₅ | CH₂CH₂OCH₂CH₂OC₂H₅ |
| 7 | 2,6-di-CH₂CH₂CN | H | H | 2,6-di-CH₂CN | CH₂Ph | CH₂Ph |
| 6 | 4-CH₂CH₂OC₂H₅ | H | 4-CH₂C₆H₅ | 5-CH₂CH₂OC₂H₅ | CH₂C₆H₁₁ | CH₂C₆H₁₁ |
| 6 | 4-CH₂C₆H₅ | H | 7-SO₂CH₃ | 2,6-di-CH₂CN | H | C₆H₄—o-OH |
| 6 | 4-CH₂C₆H₁₁ | C₃H₇—n | 4-CH₂C₆H₅ | 5-COOH | C₂H₅ | CH₂CH₂OH |
| 6 | 4-CH₂CH(OH)CH₂OH | C₃H₇—n | 7-COOCH₃ | 5-CH₂CH(OH)CH₂OH | CH₂CH₂—SO₃K | CH₂CH₂—SO₃K |
| 6 | 4-CH₂CH₂—SO₃K | H | 7-CHO | 5-CH₂CH₂—SO₃K | H | C₆H₄—p-OSO₃K |
| 6 | 4-OC₂H₅ | H | 7-CONH₂ | 5-CH₂OC₂H₅ | H | CH₂OPh |
| 6 | 4-OOCC₆H₅ | H | 7-CONHCH₃ | 5-CH₂OOCC₆H₅ | CH₂SO₂NHCH₃ | CH₂SO₂NHPh |
| 6 | 5-CH₂SO₃K | H | 7-CH₂Ph | 5-CH₂SO₃K | H | CH₂SO₂NHCH₃ |
| 6 | 4-C₆H₄—p-SO₂N(C₂H₅)₂ | H | 7-CH₂OSO₃K | 4-C₆H₄—p-SO₂N(C₂H₅)₂ | CH₂SO₂NHCH₃ | C₆H₄—p-SO₂NHCH₃ |
| 6 | 4-CH₂CH₂NHCOOCH₃ | H | 7-C₆H₄—p-SO₃K | 5-CH₂CH₂NHCOOCH₃ | H | CH₂COOCH₃ |
| 6 | 4-CH₂NHCONHCH₃ | H | 7-CH₂CH₂OH | 5-CH₂NHCONHCH₃ | CH₂COOCH₃ | C₆H₄—p-NHCOOCH₃ |
| 6 | 4-CH₂CONH₂ | H | 7-CH₂Cl | 5-CH₂CONH₂ | H | CH₂CH₂CONH₂ |
| 6 | 5-CH₂CONHCH₃ | C₄H₉—n | 7-C₆H₄—p-Br | 5-CONH₂ | C₂H₅ | C₆H₄—p-NHCOOCH₃ |
| 6 | 4-CH₂CON(CH₃)₂ | H | H | 3-SO₂NH₂ | C₂H₅ | C₆H₄—p-CONHCH₃ |

TABLE 1-continued

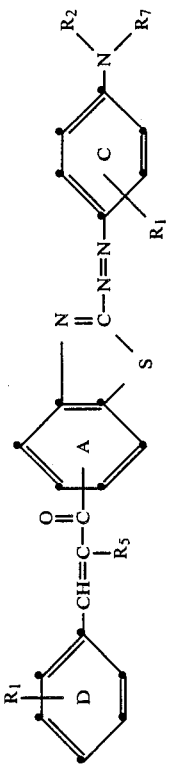

| Cinnamoyl Group Position | $R_1$ on D | $R_5$ | Substituents on A | $R_1$ on C | $R_2$ | $R_7$ |
|---|---|---|---|---|---|---|
| 6 | 4-$CH_2CH_2OCH_2CH_2OC_2H_5$ | H | 4-$COCH_3$ | 5-$SO_2NHCH_3$ | $C_2H_5$ | $C_6H_4$—p-$SCH_3$ |
| 6,7 | 4-$CH_2SC_2H_5$ | H | 4-$NO_2$ | 5-$SO_2N(C_2H_5)_2$ | $CH_2CH_2SCH_3$ | $CH_2CH_2SCH_3$ |
| 6 | 5-$CH_2SC_6H_5$ | $CH_3$ | 4-Cl | 5-$SO_3C_6H_5$ | H | $CH_2$—$C_6H_4$—p-$SCH_3$ |
| 6 | 4-$CH_2SO_2C_2H_5$ | $CH_3$ | 4-CN | 5-$SCH_3$ | $CH_2SO_2C_2H_5$ | $CH_2SO_2C_2H_5$ |
| 6 | 2,4-di-$CH_2SO_2C_6H_5$ | $CH_3$ | 4-$NHSO_2CH_3$ | 2,5-di-SCN | H | $CH_2SO_2Ph$ |
| 6 | 4-$C_6H_3$—o,p-di-CN | $CH_3$ | 7-$CH_3$ | 5-$SO_2C_6H_5$ | H | $CH_2CH_2OSO_3K$ |
| 6 | 4-$C_6H_2$—o,m,p-tri-Cl | $CH_3$ | 7-$OCH_3$ | 2-CHO—6-CN | H | $C_6H_4$—p-$OSO_3K$ |
| 6 | 2,6-di-$OSO_3Na$ | H | 4-Ph | 5-$CONHC_2H_5$ | $C_2H_5$ | $CH_2$—p-$(C_8H_4O_2N)$ |
| 6 | H | H | 7-$CH_2(C_4H_4O_2N)$ | 5-$CON(C_2H_5)_2$ | $C_2H_5$ | $C_2H_5$ |
| 6 | H | H | 7-$CH_2(C_4H_3O)$ | 3-$C_6H_{11}$ | $C_2H_5$ | $C_2H_5$ |
| 6 | 5-$CH_2(C_8H_4O_2N)$ | H | H | 3-$SC_6H_5$ | $C_2H_5$ | $C_2H_5$ |
| 6 | 5-$CH_2(C_4H_3O)$ | H | H | 6-$NHSO_2C_6H_5$ | $C_2H_5$ | $C_2H_5$ |
| 5 | 2-$SO_3Na$ | H | H | 3$NHCOCH_3$ | $C_2H_5$ | $C_2H_5$ |
| 5 | H | H | H | 3$NHCOCH_3$ | $C_2H_5$ | $C_2H_5$ |

TABLE 2

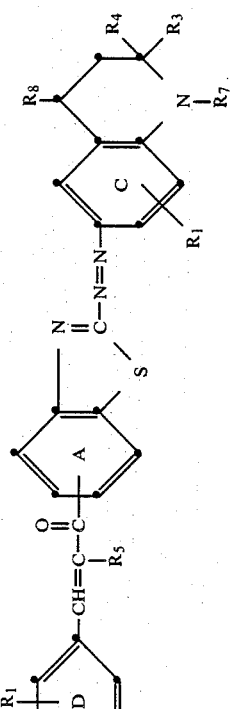

| Cinnamoyl Group Position | $R_1$ on D | $R_5$ | Substituents on A | $R_1$ on C | $R_3$ | $R_4$ | $R_8$ | $R_7$ |
|---|---|---|---|---|---|---|---|---|
| 6 | H | H | H | H | H | $CH_3$ | H | H |
| 6 | 4-$NO_2$ | H | 4-$COCH_3$ | 7-$CH_3$ | $CH_3$ | $CH_3$ | $CH_3$ | Ph |
| 6 | 4-CN | H | 4-$NO_2$ | 5-$OCH_3$ | $CH_3$ | $CH_3$ | H | $C_6H_{11}$ |
| 6 | 5-$COCH_3$ | $CH_3$ | 4-Cl | 5-$OCH_3$ | $CH_3$ | $CH_3$ | H | $CH_2$—CH=$CH_2$ |
| 5,7 | 4-COPh | $CH_3$ | 4-CN | 7-$SO_3Na$ | $CH_3$ | $CH_3$ | H | $CH_2OOCC_2H_5$ |
| 5 | 2,4-di-COOH | $CH_3$ | 4-$NHSO_2CH_3$ | 7-$OCH_2CH_2SO_4K$ | $CH_3$ | $CH_3$ | H | $CH_2OOCC_2H_5$ |
| 6 | 4-OOCCH_3 | $CH_3$ | 4-OOCCH_3 | 7-$OCH_2CH_2SO_4NH(Et)_3$ | $CH_3$ | H | H | $C_6H_4$—p-OOCCH_3 |
| 6 | 4-NHCOCH_3 | $CH_3$ | 7-$CH_3$ | 7-$CH_3$ | $CH_3$ | H | H | $C_6H_{10}$—4-$CH_3$ |
| 6 | 4-NHCOPh | $CH_3$ | 7-$OCH_3$ | 7-Ph | $CH_3$ | H | H | $CH_2CH_2(C_4H_4O_2N)$ |
| 4 | 4-Ph | H | 4-Ph | 7-$NO_2$ | $CH_3$ | $CH_3$ | H | $CH_2CH_2NO_2$ |
| 6 | 2,5-di-Cl | H | H | 7-CN | $CH_3$ | $CH_3$ | H | $C_6H_4$—p-$NO_2$ |
| 6 | 2-Cl—4-$SO_2CH_3$ | H | 4-$SO_3Na$ | 7-$OCH_3$ | H | $C_2H_5$ | $C_2H_5$ | $CH_2NHOCCH_3$ |
| 6 | 4-$NHSO_2CH_3$ | H | 4-$SO_3Na$ | 7-$NHCOCH_3$ | $CH_3$ | H | $CH_3$ | $CH_2NHSO_2CH_3$ |
| 6 | 4-$COOCH_3$ | H | 7-$OCH_2CH_2SO_4K$ | 7-$NHSO_2CH_3$ | $CH_3$ | $CH_3$ | H | $C_6H_4$—p-$NHOCCH_3$ |
| 6 | 2-$OCH_3$ | $C_2H_5$ | 7-$OCH_2CH_2SO_4K$ | 7-COOH | $CH_3$ | $CH_3$ | H | $C_6H_4$—p-$NHSO_2CH_3$ |
| 6 | 4-$OC_2H_5$ | $C_2H_5$ | 4-NHCOPh | 7-Cl | $CH_3$ | $CH_3$ | H | $C_6H_{10}$—4-$NHOCCH_3$ |
| 5 | 4-$SO_3Na$ | $C_2H_5$ | 4-NHCOPh | 5,7-di-Br | $CH_3$ | $CH_3$ | H | $CH_2CH_2Cl$ |
| 6 | 2-$SO_3Na$ | H | 7-$NHCOCH_3$ | 5,7-di-Br | $CH_3$ | $CH_3$ | H | $C_6H_4$—p-Br |
| 7 | 2-$OCH_3$—4-$SO_3K$ | H | 7-$OOCC_2H_5$ | 5-$OCH_3$—7-$NHCOCH_3$ | $CH_3$ | $CH_3$ | $C_2H_5$ | $C_6H_4$—p-CN |
| 6 | 4-$OCH_2CH_2OSO_3K$ | $C_3H_7$—n | 4-COOH | 7-$CH_2OOCCH_3$ | $CH_3$ | $CH_3$ | H | $CH_2CH_2CN$ |
| 6 | 2-$SO_3Na$—5-Cl | $C_3H_7$—n | H | 7-$CH_2Cl$ | $CH_3$ | $CH_3$ | H | $CH_2CH_2OC_2H_5$ |
| 6 | 4-Cl | H | 7-$SO_2CH_3$ | 7-CN | $CH_3$ | $CH_3$ | $C_2H_5$ | $CH_2CH_2OCH_2CH_2OC_2H_5$ |
| 6 | 4-OH | H | 7-$CF_3$ | 5-COOH | $CH_3$ | $CH_3$ | H | $CH_2Ph$ |
| 6 | 4-$CH_2OOCCH_3$ | H | 7-COOCH_3 | 5-OH | $CH_3$ | $CH_3$ | H | $C_6H_4$—o-OH |
| 6 | 4-$SO_3K$ | H | 7-CHO | 5-$CH_2CH=CH_2$ | $CH_3$ | $CH_3$ | H | $CH_2CH_2OH$ |
| 4,6 | 4-OPh | H | 7-$CONH_2$ | 7-$CH_3$ | $CH_3$ | $CH_3$ | H | $CH_2SO_2$—$SO_3K$ |
| 6 | 4-$NO_2$ | H | 7-$CONHCH_3$ | 7-OOCCH_3 | $CH_3$ | $CH_3$ | H | $C_6H_4$—p-$OSO_3K$ |
| 6 | 5-CN | H | 7-$CH_2Ph$ | 7-OOCCH_3 | H | $C_2H_5$ | $C_2H_5$ | $CH_2OPh$ |
| 6 | 4-COCH_3 | H | 7-$CH_2SO_3K$ | 7-$SO_3Na$ | $CH_3$ | $CH_3$ | H | $CH_2SO_2NHPh$ |
| 5 | 5-$CH_3$ | H | 7-$CH_2OSO_3K$ | 7-$OCH_2CH_2SO_4K$ | $CH_3$ | $CH_3$ | $CH_3$ | $CH_2SO_2NHCH_3$ |
| 6 | 5-Ph | H | 7-$C_6H_4$—p-$SO_3K$ | 7-$OCH_2CH_2SO_3K$ | $CH_3$ | $CH_3$ | H | $C_6H_4$—p-$SO_2NHCH_3$ |
| 6 | 5-$OCH_3$ | H | 7-$CH_2CH_2OH$ | 7-$CH_3$ | $CH_3$ | $CH_3$ | H | $C_6H_4$—p-$SO_2N(CH_3)_2$ |
| 6 | 4,5-di-Br | H | 7-$CH_2Cl$ | 7-OOCCH_3 | $CH_3$ | $CH_3$ | H | $CH_2COOCH_3$ |
| 6 | 5-COOH | $C_4H_9$—n | 7-$C_6H_4$—p-Br | 7-Ph | $CH_3$ | $CH_3$ | H | $CH_3SO_2N(CH_3)_2$ |
| 6 | H | H | H | 7-$NO_2$ | $CH_3$ | $CH_3$ | H | $C_6H_4$—p-$NHCOOCH_3$ |
| 6 | 4-$NO_2$ | H | 4-COCH_3 | 7-$OCH_3$ | $CH_3$ | $CH_3$ | H | $CH_2COOCH_3$ |
| 6 | 4-CN | H | 4-$NO_2$ | 7-$NHCOCH_3$ | $CH_3$ | $CH_3$ | H | $CH_2CH_2CONH_2$ |
| 6 | 5-COCH_3 | H | 4-Cl | 7-$NHSO_2CH_3$ | $CH_3$ | $CH_3$ | H | $C_6H_4$—p-$CONHCH_3$ |
| 6 | | | | 7-COOCH_3 | $CH_3$ | $CH_3$ | H | $C_6H_4$—p-$SCH_3$ |
| 6 | | | | | $CH_3$ | $CH_3$ | H | $CH_2CH_2SCH_3$ |
| 6 | | | | | $CH_3$ | $CH_3$ | H | $CH_2$—$C_6H_4$—p-$SCH_3$ |

TABLE 2-continued

| Cinnamoyl Group Position | $R_1$ on D | $R_5$ | Substituents on A | $R_1$ on C | $R_3$ | $R_4$ | $R_8$ | $R_7$ |
|---|---|---|---|---|---|---|---|---|
| 6 | 4-COPh | $CH_3$ | 4-CN | 7-COOH | $CH_3$ | $CH_3$ | H | $CH_2SO_2C_2H_5$ |
| 6 | 2,4-di-COOH | $CH_3$ | 4-NHSO$_2$CH$_3$ | 7-Cl | $CH_3$ | $CH_3$ | H | $CH_2SO_2Ph$ |
| 6 | 4-OOCCH$_3$ | $CH_3$ | 7-CH$_3$ | 5,7-di-Br | $CH_3$ | H | H | $CH_2CH_2OSO_3K$ |
| 6 | 4-NHCOCH$_3$ | $CH_3$ | 7-OCH$_3$ | 5,7-di-Br | $CH_3$ | H | H | $C_6H_4$—p-OSO$_3$K |
| 5 | 4-NHCOPh | $CH_3$ | 4-Ph | 5-OCH$_3$,7-NHCOCH$_3$ | $C_2H_5$ | H | H | $CH_2(C_8H_4O_2N)$ |
| 6 | 4-CH$_2$CH=CH$_2$ | H | H | 7-NHCOCH$_3$ | $C_2H_5$ | H | H | $C_2H_5$ |
| 6,7 | H | $CH_3$ | H | 7-OCPh | H | H | H | $C_2H_5$ |
| 6 | 4-CONH$_2$ | $CH_3$ | 4-COCH$_3$ | 7-CH$_2$CONHCH$_3$ | $CH_3$ | $CH_3$ | $CH_3$ | H |
| 6 | 3-SO$_2$NH$_2$ | $CH_3$ | 4-NO$_2$ | 7-CH$_3$CON(CH$_3$)$_2$ | $CH_3$ | $CH_3$ | H | Ph |
| 6 | 4-SO$_2$NHCH$_3$ | H | 4-Cl | 7-CH$_2$CH$_2$OCH$_2$CH$_2$OC$_2$H$_5$ | $CH_3$ | $CH_3$ | H | $C_6H_{11}$ |
| 6 | 4-SO$_2$N(C$_2$H$_5$)$_2$ | H | 4-CN | 7-CH$_2$SC$_2$H$_5$ | $CH_3$ | $CH_3$ | H | $CH_2$—CH=CH$_2$ |
| 6 | 4-SO$_3$C$_6$H$_5$ | H | 4-NHSO$_2$CH$_3$ | 7-CH$_2$SC$_6$H$_5$ | $CH_3$ | $CH_3$ | H | $CH_2OOCC_2H_5$ |
| 7 | 4-SCH$_3$ | $CH_3$ | 7-CH$_3$ | 7-CH$_2$SO$_2$C$_2$H$_5$ | $CH_3$ | $CH_3$ | H | $C_6H_4$—p-OOCCH$_3$ |
| 6 | 2,4-di-SCN | $CH_3$ | 7-OCH$_3$ | 7-CH$_2$SO$_2$C$_6$H$_5$ | $CH_3$ | $CH_3$ | H | $C_6H_{10}$—4-CH$_3$ |
| 6 | 4-SO$_2$C$_6$H$_5$ | H | 4-Ph | 7-C$_6$H$_4$—o,p-di-CN | $CH_3$ | $CH_3$ | H | $CH_2CH_2$—(C$_4$H$_4$O$_2$N) |
| 6 | 2-CHO—4-CN | $CH_3$ | H | 7-C$_6$H$_2$—o,m,p-tri-Cl | $CH_3$ | $CH_3$ | H | $CH_2CH_2NO_2$ |
| 6 | 4-CONHC$_2$H$_5$ | H | 4-SO$_3$Na | 5,7-di-OSO$_3$NH(CH$_3$)$_3$ | $CH_3$ | $CH_3$ | H | $C_6H_4$—p-NO$_2$ |
| 6 | 4-CON(C$_2$H$_5$)$_2$ | H | 4-SO$_3$Na | 5,7-di-OSO$_3$Na | $CH_3$ | $CH_3$ | H | $CH_2NHOCCH_3$ |
| 6 | 3-C$_6$H$_{11}$ | H | H | 5,7-di-SO$_3$NH(CH$_3$) | $CH_3$ | $CH_3$ | H | $CH_2NHSO_2CH_3$ |
| 6 | 3-SC$_6$H$_5$ | H | 4-OCH$_2$CH$_2$SO$_4$K | 5,7-di-OSO$_3$Na | H | $C_2H_5$ | $C_2H_5$ | $C_6H_4$—p-NHOCCH$_3$ |
| 6 | 4-NHSO$_2$C$_6$H$_5$ | H | 4-OCH$_2$CH$_2$SO$_4$K | 7-SC$_6$H$_{11}$ | $CH_3$ | H | H | $C_6H_{10}$—4-NHOCCH$_3$ |
| 6 | 4-SC$_6$H$_{11}$ | $C_2H_5$ | 4-NHCOPh | 7-C$_6$H$_4$—p-CH$_3$ | $CH_3$ | $CH_3$ | H | $CH_2CH_2Cl$ |
| 6 | 4-C$_6$H$_4$—p-CH$_3$ | $C_2H_5$ | 4-NHCOPh | 7-C$_6$H$_4$—p-CH$_2$CH=CH$_2$ | $CH_3$ | $CH_3$ | H | $C_6H_4$—p-Br |
| 5 | 4-C$_6$H$_4$—p-CH$_2$CH=CH$_2$ | $C_2H_5$ | 7-NHCOCH$_3$ | 7-CH$_2$CH$_2$NO$_2$ | $CH_3$ | $CH_3$ | H | $C_6H_4$—p-CN |
| 6 | 4-OCH$_2$CH$_2$NO$_2$ | H | 7-OOCC$_2$H$_5$ | 7-CH$_2$NHCOCH$_3$ | $CH_3$ | $CH_3$ | H | $CH_2CN$ |
| 6 | 2-CH$_2$NHCOCH$_3$ | $C_2H_5$ | 4-COOH | 7-CH$_2$NHSO$_2$C$_2$H$_5$ | $CH_3$ | $CH_3$ | H | $CH_2CH_2OC_2H_5$ |
| 7 | 4-CH$_2$NHSO$_2$C$_2$H$_5$ | H | H | 7-CH$_2$CH$_2$Cl | $CH_3$ | $CH_3$ | H | $CH_2CH_2OCH_2CH_2OC_2H_5$ |
| 6,7 | 4-CH$_2$CH$_2$Cl | H | H | 5,7-di-CH$_2$CN | $CH_3$ | H | $C_2H_5$ | $CH_2Ph$ |
| 6 | 2,6-di-CH$_2$CN | H | 7-SO$_3$CH$_3$ | 7-COOH | $CH_3$ | $CH_3$ | H | $C_6H_4$—o-OH |
| 6 | 4-CH$_2$C$_6$H$_5$ | H | 4-CH$_2$C$_6$H$_5$ | 7-CH$_2$C$_6$H$_{11}$ | $CH_3$ | $CH_3$ | H | $C_6H_4$—o-OH |
| 6 | 4-CH$_2$C$_6$H$_{11}$ | $C_3H_7$—n | 7-COOCH$_3$ | 7-CH$_2$C$_6$H$_5$ | $CH_3$ | $CH_3$ | H | $CH_2CH_2OH$ |
| 6 | 4-CH$_2$CH(OH)CH$_2$OH | $C_3H_7$—n | 7-CHO | 7-CH$_2$CH(OH)CH$_2$OH | $CH_3$ | $CH_3$ | H | $C_6H_4$—p-OSO$_3$K |
| 6 | 4-CH$_2$—SO$_3$K | H | 7-CONH$_2$ | 7-CH$_2$CH$_2$—SO$_3$K | $CH_3$ | H | H | $CH_2OPh$ |
| 6 | 4-CH$_2$OC$_6$H$_5$ | H | 7-CONHCH$_3$ | 7-CH$_2$OC$_6$H$_5$ | $CH_3$ | $C_2H_5$ | $C_2H_5$ | $CH_2CH_2OC_2H_5$ |
| 6 | 4-CH$_2$OOCC$_6$H$_5$ | H | 7-CONHC$_6$H$_5$ | 7-CH$_2$OOCC$_6$H$_5$ | $CH_3$ | H | H | $CH_2SO_2NHPh$ |
| 5 | 4-CH$_2$COOCH$_3$ | H | 7-CH$_2$Ph | 7-CH$_2$COOCH$_3$ | $CH_3$ | $CH_3$ | $CH_3$ | $CH_2SO_2NHCH_3$ |
| 6 | 4-C$_6$H$_4$—p-SO$_2$N(C$_2$H$_5$)$_2$ | H | 7-CH$_2$OSO$_3$K | 7-C$_6$H$_4$—p-SO$_2$N(C$_2$H$_5$)$_2$ | $CH_3$ | $CH_3$ | H | $C_6H_4$—p-SO$_2$NHCH$_3$ |
| 6 | 4-CH$_2$CH$_2$NHCOCH$_3$ | H | 7-C$_6$H$_4$—p-SO$_3$K | 7-CH$_2$CH$_2$NHCOCH$_3$ | $CH_3$ | $CH_3$ | H | $CH_2COOCH_3$ |
| 6 | 4-CH$_2$NHCONHCH$_3$ | H | 7-CH$_2$CH$_2$OH | 7-CH$_2$NHCONHCH$_3$ | $CH_3$ | $CH_3$ | H | $CH_2SO_2N(CH_3)_2$ |

TABLE 3

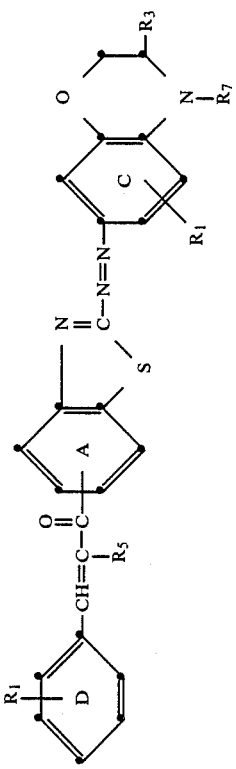

| Cinnamoyl Group Position | $R_1$ on D | $R_5$ | Substituents on A | $R_1$ on C | $R_3$ | | $R_7$ |
|---|---|---|---|---|---|---|---|
| 6 | H | H | H | 6-$CH_3$ | H | | H |
| 6 | 4-$NO_2$ | H | 4-$COCH_3$ | 6-$COCH_3$ | $CH_3$ | | Ph |
| 6 | 4-CN | H | 4-$NO_2$ | 6-$OCH_3$ | $C_2H_5$ | | $C_6H_{11}$ |
| 6 | 5-$COCH_3$ | $CH_3$ | 4-Cl | 6-$SO_3Na$ | H | | $CH_2$—CH=$CH_2$ |
| 7 | 5-COPh | $CH_3$ | 4-CN | 6-$OCH_2CH_2SO_4K$ | H | | $CH_2OOCC_2H_5$ |
| 5 | 2,4-di-COOH | $CH_3$ | 4-$NHSO_2CH_3$ | 6-$OCH_2CH_2SO_4K$ | H | | $C_6H_4$—p-OOC$CH_3$ |
| 6 | 4-OOCCH_3 | $CH_3$ | 7-$CH_3$ | 6-$CH_3$ | $CH_3$ | | $C_6H_{10}$—4-$CH_3$ |
| 6 | 4-NHCOCH_3 | $CH_3$ | 7-$OCH_3$ | 6-Ph | $CH_3$ | | $CH_2CH_2(C_4H_4O_2N)$ |
| 6,7 | 4-NHCOPh | $CH_3$ | 4-Ph | 6-$NO_2$ | $CH_3$ | | $CH_2CH_2NO_2$ |
| 4 | 4-$C_2H_5$ | H | H | 6-$OCH_3$ | $CH_3$ | | $C_6H_4$—p-$NO_2$ |
| 6 | 4-Ph | $C_4H_9$—n | 7-$CH_2Cl$ | 7-$CH_2CONH_2$ | $CH_3$ | $CH_3$ | $CH_2NHOCCH_3$ |
| 6 | 4-$CH_2CONH_2$ | H | 7-$C_6H_4$—p-Br | 7-$CONH_2$ | $CH_3$ | H | $C_6H_4$—p-$NHCOOCH_3$ |
| 6 | 5-$CH_2CONHCH_3$ | H | 4-$COCH_3$ | 7-$SO_2NH_2$ | $CH_3$ | $CH_3$ | $CH_2CH_2CONH_2$ |
| 6 | 4-$CH_2CON(CH_3)_2$ | H | 4-$NO_2$ | 7-$SO_2NHCH_3$ | $CH_3$ | $CH_3$ | $C_6H_4$—p-$CONHCH_3$ |
| 6 | 4-$CH_2CH_2OCH_2CH_2OC_2H_5$ | H | 4-Cl | 7-$SO_2N(C_2H_5)_2$ | $CH_3$ | $CH_3$ | $C_6H_4$—p-$SCH_3$ |
| 6 | 4-$CH_2SC_2H_5$ | H | 4-CN | 7-$SO_3C_6H_5$ | $CH_3$ | $CH_3$ | $CH_2CH_2SCH_3$ |
| 5,6 | 5-$CH_2SC_6H_5$ | H | 4-$NHSO_2CH_3$ | 7-$SCH_3$ | $CH_3$ | $CH_3$ | $CH_2$—$C_6H_4$—p-$SCH_3$ |
| 6 | 4-$CH_2SO_2C_2H_5$ | $CH_3$ | 7-$CH_3$ | 5,7-di-SCN | $CH_3$ | $CH_3$ | $CH_2SO_2C_2H_5$ |
| 6 | 2,4-di-$CH_2SO_2C_6H_5$ | $C_2H_5$ | 7-$OCH_3$ | 7-$SO_2C_6H_5$ | $CH_3$ | $CH_3$ | $CH_2SO_2Ph$ |
| 6 | 4-$C_6H_3$—o,p-di-CN | $CH_3$ | 4-Ph | 5-CHO—7-CN | $CH_3$ | $CH_3$ | $CH_2CH_2OSO_3K$ |
| 6 | 4-$C_6H_2$—o,m,p-tri-Cl | $CH_3$ | 7-$CH_2(C_4H_4O_2N)$ | 7-$CONHC_2H_5$ | $CH_3$ | $CH_3$ | $C_6H_4$—p-$OSO_3K$ |
| 6 | 2,6-di-$OSO_3Na$ | $CH_3$ | 7-$CH_2(C_4H_3O)$ | 7-$CON(C_2H_5)_2$ | $CH_3$ | $CH_3$ | $CH_2(C_8H_4O_2N)$ |
| 6 | H | H | H | 7-$C_6H_{11}$ | $C_2H_5$ | $C_2H_5$ | $C_2H_5$ |
| 6 | H | H | H | 7-$SC_6H_5$ | $C_2H_5$ | $C_2H_5$ | $C_2H_5$ |
| 6 | 5-$CH_2(C_8H_4O_2N)$ | H | 4-$SO_3Na$ | 7-$NHSO_2C_6H_5$ | $CH_3$ | $CH_3$ | $C_2H_5$ |
| 5 | 5-$CH_2(C_4H_3O)$ | $C_2H_5$ | 4-$SO_3Na$ | 6-$NHCOCH_3$ | $CH_3$ | $CH_3$ | $CH_2NHSO_2CH_3$ |
| 6 | 2,5-di-Cl | $C_2H_5$ | H | 6-$NHSO_2CH_3$ | $C_2H_5$ | $C_2H_5$ | $C_6H_4$—p-$NHOCCH_3$ |
| 6 | 2-Cl—4-$SO_2CH_3$ | $C_2H_5$ | H | 6-$NHSO_2CH_3$ | $CH_3$ | $CH_3$ | $C_6H_4$—p-$NHSO_2CH_3$ |
| 6 | 4-$NHSO_2CH_3$ | $C_2H_5$ | 7-$OCH_2CH_2SO_4K$ | 6-$COOCH_3$ | $CH_3$ | $CH_3$ | $C_6H_{10}$—4-$NHOCCH_3$ |
| 6 | 4-$COOCH_3$ | H | 7-$OCH_2CH_2SO_4K$ | 6-COOH | H | | $CH_2CH_2Cl$ |
| 6 | 2-$OCH_3$ | $C_2H_5$ | 4-NHCOPh | 6-Cl | $CH_3$ | | $C_6H_4$—p-Br |
| 5 | 4-$OC_2H_5$ | $C_2H_5$ | 7-NHCOPh | 5,6-di-Br | H | | $C_6H_4$—p-CN |
| 6 | 4-$SO_3Na$ | $C_2H_5$ | 7-NHCOCH_3 | 5,6-di-Br | H | | $CH_2CH_2CN$ |
| 6 | 2-$SO_3Na$ | H | 7-OOCCH_3 | 5-$OCH_3$—6-$NHCOCH_3$ | H | | $CH_2CH_2OC_2H_5$ |
| 6 | 2-$OCH_3$—4-$SO_3K$ | H | 4-COOH | 6-$CH_2OOCCH_3$ | $CH_3$ | | $CH_2CH_2OCH_2CH_2OC_2H_5$ |
| 6,7 | 4-$OCH_2CH_2OSO_3K$ | H | H | 6-CN | $CH_3$ | | $CH_2Ph$ |
| 6 | 2-$SO_3Na$—5-Cl | H | 7-$SO_2CH_3$ | 6-OOCCH_3 | $CH_3$ | | $CH_2$—$C_6H_{11}$ |
| 6 | 4-Cl | H | 7-$CF_3$ | 5-COOH | $CH_3$ | | $CH_2CH_2OCH_2CH_2OC_2H_5$ |
| 6 | 4-OH | H | H | H | $CH_3$ | | $C_6H_4$—o-OH |

TABLE 3-continued

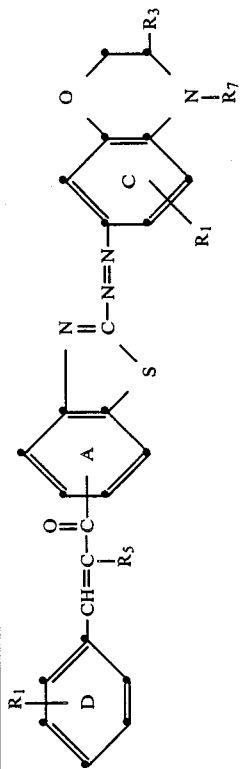

| Cinnamoyl Group Position | $R_1$ on D | $R_5$ | Substituents on A | $R_1$ on C | $R_3$ | $R_7$ |
|---|---|---|---|---|---|---|
| 6 | 4-$CH_2OOCCH_3$ | $C_3H_7-n$ | 7-$COOCH_3$ | 5-OH | $CH_3$ | $CH_2CH_2OH$ |
| 6 | 4-$SO_3K$ | $C_3H_7-n$ | 7-CHO | 5-$CH_2CH=CH_2$ | $C_2H_5$ | $CH_2CH_2-SO_3K$ |
| 6 | 4-OPh | H | 7-$CONH_2$ | 6-$CH_3$ | $CH_3$ | $C_6H_4-p-OSO_3K$ |
| 6 | 4-$NO_2$ | H | 7-$CONHCH_3$ | 6-$OCH_3$ | $CH_3$ | $CH_2OPh$ |
| 6 | 5-CN | H | 7-$CH_2Ph$ | 6-$COCH_3$ | H | $CH_2SO_2NHPh$ |
| 6 | 4-$COCH_3$ | H | 7-$CH_2SO_3K$ | 6-$SO_3Na$ | H | $CH_2SO_2NHCH_3$ |
| 6 | 5-$CH_3$ | H | 7-$CH_2OSO_3K$ | 6-$OCH_2CH_2SO_4K$ | H | $C_6H_4-p-SO_2NHCH_3$ |
| 6 | 5-Ph | H | 7-$C_6H_4-p-SO_3K$ | 6-$OCH_2CH_2SO_3K$ | H | $CH_2COOCH_3$ |
| 6 | 5-$OCH_3$ | H | 7-$CH_2CH_2OH$ | 6-$CH_3$ | H | $CH_2SO_2N(CH_3)_2$ |
| 6 | 4,5-di-Br | H | 7-$CH_2Cl$ | 6-Ph | $C_2H_5$ | $C_6H_4-p-NHCOOCH_3$ |
| 6 | 5-COOH | $C_4H_9-n$ | 7-$C_6H_4-p-Br$ | 6-$NO_2$ | $C_2H_5$ | $CH_2CH_2CONH_2$ |
| 6 | H | H | H | 6-$OCH_3$ | $CH_3$ | $C_6H_4-p-CONHCH_3$ |
| 6 | 4-$NO_2$ | H | 4-$COCH_3$ | 6-$NHCOCH_3$ | $C_3H_7-n$ | $C_6H_4-p-SCH_3$ |
| 6 | 4-CN | H | 4-$NO_2$ | 6-$NHSO_2CH_3$ | H | $CH_2CH_2SCH_3$ |
| 6 | 5-$COCH_3$ | $CH_3$ | 4-Cl | 6-COOH | $CH_3$ | $CH_2-C_6H_4-p-SCH_3$ |
| 6 | 4-COPh | $CH_3$ | 4-CN | 8-Cl | H | $CH_2SO_2-C_2H_5$ |
| 6 | 2,4-di-COOH | $CH_3$ | 4-$NHSO_2CH_3$ | 5,6-di-Br | H | $CH_2SO_2Ph$ |
| 6 | 4-$OOCCH_3$ | $CH_3$ | 4-$CH_3$ | 5,6-di-Br | H | $CH_2CH_2OSO_3K$ |
| 6 | 4-$NHCOCH_3$ | $CH_3$ | 7-$OCH_3$ | 5-$OCH_3$—6-$NHCOCH_3$ | H | $C_6H_4-p-OSO_3K$ |
| 6 | 4-NHCOPh | $CH_3$ | 4-Ph | 6-$NHCOCH_3$ | H | $CH_2(C_8H_4O_2N)$ |
| 5 | 4-$CH_2CH=CH_2$ | $CH_3$ | H | 6-OCPh | $C_2H_5$ | $C_2H_5$ |
| 6,7 | H | H | H | 6-$CH_2CONHCH_3$ | $C_2H_5$ | $C_2H_5$ |
| 6 | 4-$CONH_2$ | H | 4-$COCH_3$ | 6-$CH_2CON(CH_3)_2$ | H | H |
| 6 | 3-$SO_2NH_2$ | H | 4-$NO_2$ | 6-$CH_2OCH_2CH_2OC_2H_5$ | $CH_3$ | Ph |
| 6 | 4-$SO_2NH(C_2H_5)_2$ | H | 4-Cl | 6-$CH_2SC_2H_5$ | $C_2H_5$ | $C_6H_{11}$ |
| 7 | 4-$SO_3C_6H_5$ | $CH_3$ | 4-CN | 6-$CH_2SC_6H_5$ | H | $CH_2-CH=CH_2$ |
| 5 | 4-$SCH_3$ | $CH_3$ | 4-$NHSO_2CH_3$ | 6-$CH_2SO_2C_2H_5$ | H | $CH_2OOCC_2H_5$ |
| 6 | 2,4-di-SCN | $CH_3$ | 7-$CH_3$ | 6-$CH_2SO_2C_6H_5$ | H | $C_6H_4-p-OOCCH_3$ |
| 6 | 4-$SO_2C_6H_5$ | $CH_3$ | 7-$OCH_3$ | 6-$C_6H_3-9,p-di-CN$ | H | $C_6H_{10}-4-CH_3$ |
| 6 | 2-CHO—4-CN | $CH_3$ | 4-Ph | 6-$C_6H_2-9,m,p-tri-Cl$ | $CH_3$ | $CH_2CH_2-(C_4H_4O_2N)$ |
| 6 | 4-$CONHC_2H_5$ | H | H | 6,8-di-$OSO_3NH(CH_3)_3$ | $CH_3$ | $CH_2CH_2NO_2$ |
| 4 | 4-$CON(C_2H_5)_2$ | H | 4-$SO_3Na$ | 5,6-di-$OSO_3Na$ | $CH_3$ | $C_6H_4-p-NO_2$ |
| 6 | 3-$C_3H_{11}$ | H | 4-$SO_3Na$ | 5,6-di-$OSO_3Na$ | $CH_3$ | $CH_2NHOCCH_3$ |
| 6 | 3-$SC_6H_5$ | H | 7-$OCH_2CH_2SO_4K$ | 5,6-di-$OSO_3Na$ | $C_2H_5$ | $CH_2NHSO_2CH_3$ |
| 4 | 4-$NHSO_2C_6H_5$ | H | 7-$OCH_2CH_2SO_4K$ | 6-$SC_6H_{11}$ | $CH_3$ | $C_6H_4-p-NHOCCH_3$ |
| 6 | 4-$SC_6H_{11}$ | H | 4-$NHCOCH_3$ | 6-$C_6H_4-p-CH_3$ | H | $C_6H_4-p-NHSO_2CH_3$ |
| 6 | 4-$C_6H_4-p-CH_3$ | $C_2H_5$ | 4-NHCOPh | 6-$C_6H_4-p-CH_2CH=CH_2$ | $CH_3$ | $C_6H_{10}-4-NHOCCH_3$ |
| 5 | 4-$C_6H_4-p-CH_2CH=CH_2$ | $C_2H_5$ | | | $CH_3$ | $CH_2CH_2Cl$ |
| | | | | | $C_2H_5$ | $C_6H_4-p-Br$ |

TABLE 3-continued

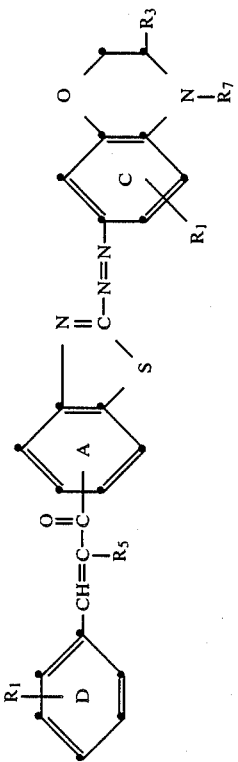

| Cinnamoyl Group Position | $R_1$ on D | $R_5$ | Substituents on A | $R_1$ on C | $R_3$ | $R_7$ |
|---|---|---|---|---|---|---|
| 6 | 4-OCH$_2$CH$_2$NO$_2$ | C$_2$H$_5$ | 7-NHCOCH$_3$ | 6-OCH$_2$CH$_2$NO$_2$ | H | C$_6$H$_4$—p-CN |
| 6 | 2-CH$_2$NHCOCH$_3$ | C$_2$H$_5$ | 7-OOCC$_2$H$_5$ | 6-CH$_2$NHCOCH$_3$ | H | CH$_2$CH$_2$CN |
| 7 | 4-CH$_2$NHSO$_2$C$_2$H$_5$ | H | 4-COOH | 6-CH$_2$NHSO$_2$C$_2$H$_5$ | H | CH$_2$CH$_2$OC$_2$H$_5$ |
| 6 | 4-CH$_2$CH$_2$Cl | H | H | 6-CH$_2$CH$_2$Cl | H | CH$_2$CH$_2$OCH$_2$CH$_2$OC$_2$H$_5$ |
| 6,7 | 2,6-di-CH$_2$CN | H | H | 5,6-di-CH$_2$CN | H | CH$_2$Ph |
| 6 | 4-CH$_2$CH$_2$OC$_2$H$_5$ | C$_3$H$_7$—n | 7-SO$_2$CH$_3$ | 6-CH$_2$CH$_2$OC$_2$H$_5$ | CH$_3$ | CH$_2$C$_6$H$_{11}$ |
| 6 | 4-CH$_2$C$_6$H$_5$ | C$_3$H$_7$—n | 4-CH$_2$C$_6$H$_5$ | 6-COOH | CH$_3$ | C$_6$H$_4$—o-OH |
| 6 | 4-CH$_2$C$_6$H$_{11}$ | H | 7-COOCH$_3$ | 6-CH$_2$C$_6$H$_{11}$ | CH$_3$ | CH$_2$CH$_2$OH |
| 6 | 4-CH$_2$CH(OH)CH$_2$OH | H | 7-CHO | 6-CH$_2$CH(OH)CH$_2$OH | C$_2$H$_5$ | CH$_2$CH$_2$—SO$_3$K |
| 6 | 4-CH$_2$CH$_2$—SO$_3$K | H | 7-CONH$_2$ | 6-CH$_2$CH$_2$—SO$_3$K | CH$_3$ | C$_6$H$_4$—p-OSO$_3$K |
| 6 | 4-CH$_2$OC$_6$H$_5$ | H | 7-CONHCH$_3$ | 6-CH$_2$OC$_6$H$_5$ | CH$_3$ | C$_6$H$_4$OPh |
| 6 | 4-CH$_2$OOCC$_6$H$_5$ | H | 7-CH$_2$Ph | 6-CH$_2$OOCC$_6$H$_5$ | H | CH$_2$SO$_2$NHPh |
| 6 | 5-CH$_2$COOCH$_3$ | H | 7-CH$_2$SO$_3$K | 5-CH$_2$COOCH$_3$ | CH$_3$ | CH$_2$SO$_2$NHCH$_3$ |
| 6 | 4-C$_6$H$_4$—p-SO$_2$N(C$_2$H$_5$)$_2$ | H | 7-CH$_2$OSO$_3$K | 6-C$_6$H$_4$—p-SO$_2$N(C$_2$H$_5$)$_2$ | H | C$_6$H$_4$—p-SO$_2$NHCH$_3$ |
| 6 | 4-CH$_2$CH$_2$NHCOOCH$_3$ | H | 7-C$_6$H$_4$—p-SO$_3$K | 6-CH$_2$CH$_2$NHCOOCH$_3$ | H | CH$_2$COOCH$_3$ |
| 6 | 4-CH$_2$NHCONHCH$_3$ | H | 7-CH$_2$CH$_2$OH | 6-CH$_2$NHCONHCH$_3$ | H | CH$_2$SO$_2$N(CH$_3$)$_2$ |
| 6 | 4-CH$_2$CONH$_2$ | C$_4$H$_9$—n | 7-CH$_2$Cl | 6-CH$_2$CONH$_2$ | C$_2$H$_5$ | C$_6$H$_4$—p-NHCOOCH$_3$ |
| 6 | 5-CH$_2$CONHCH$_3$ | H | 7-C$_6$H$_4$—p-Br | 6-CONH$_2$ | C$_2$H$_5$ | CH$_2$CH$_2$CONH$_2$ |
| 6 | 4-CH$_2$CON(CH$_3$)$_2$ | H | H | 6-SO$_2$NH$_2$ | CH$_3$ | C$_6$H$_4$—p-CONHCH$_3$ |
| 6 | 4-CH$_2$CH$_2$OCH$_2$CH$_2$OC$_2$H$_5$ | H | 4-COCH$_3$ | 6-SO$_2$NHCH$_3$ | C$_3$H$_7$—n | C$_6$H$_4$—p-SCH$_3$ |
| 6 | 4-CH$_2$SC$_2$H$_5$ | H | 4-NO$_2$ | 6-SO$_2$N(C$_2$H$_5$)$_2$ | H | CH$_2$CH$_2$SCH$_3$ |
| 6 | 4-CH$_2$SC$_6$H$_5$ | H | 4-Cl | 6-SO$_3$C$_6$H$_5$ | CH$_3$ | CH$_2$—C$_6$H$_4$—p-SCH$_3$ |
| 6 | 4-CH$_2$SO$_2$C$_2$H$_5$ | CH$_3$ | 4-CN | 6-SCH$_3$ | H | CH$_2$SO$_2$Ph |
| 5,6 | 2,4-di-CH$_2$SO$_2$C$_6$H$_5$ | CH$_3$ | 4-NHSO$_2$CH$_3$ | 5,6-di-SCN | H | CH$_2$CH$_2$OSO$_3$K |
| 6 | 4-C$_6$H$_3$—o,p-di-CN | CH$_3$ | 7-CH$_3$ | 5-SO$_2$C$_6$H$_5$ | H | C$_6$H$_4$—p-OSO$_3$K |
| 6 | 4-C$_6$H$_2$—o,m,p-tri-Cl | CH$_3$ | 7-OCH$_3$ | 5-CHO—6-CN | H | CH$_2$—(C$_8$H$_4$O$_2$N) |
| 6 | 2,6-di-OSO$_3$Na | CH$_3$ | 4-Ph | 6-CONHC$_2$H$_5$ | H | C$_2$H$_5$ |
| 6 | H | H | 7-CH$_2$(C$_4$H$_4$O$_2$N) | 6-CON(C$_2$H$_5$)$_2$ | H | C$_2$H$_5$ |
| 6 | H | H | 7-CH$_2$(C$_4$H$_3$O) | 6-C$_6$H$_{11}$ | H | C$_2$H$_5$ |
| 6 | 5-CH$_2$(C$_8$H$_4$O$_2$N) | H | H | 6-SC$_6$H$_5$ | H | C$_2$H$_5$ |
| 6 | 5-CH$_2$(C$_4$H$_3$O) | H | H | 6-NHSO$_2$C$_6$H$_5$ | H | C$_2$H$_5$ |

TABLE 4

| Cinnamoyl Group Position | R₁ on D | R₅ | Substituents on B | R₁ on C | R₂ | R₇ |
|---|---|---|---|---|---|---|
| 5 | H | H | H | H | H | H |
| 5 | 4-NO₂ | H | 4-COCH₃ | 2-CH₃ | C₂H₅ | Ph |
| 5 | 4-CN | H | 4-NO₂ | 5-COCH₃ | C₂H₅ | C₆H₁₁ |
| 5 | 5-COCH₃ | H | 4-Cl | 5-OCH₃ | H | CH₂—CH=CH₂ |
| 5,7 | 4-COPh | CH₃ | 4-CN | 5-SO₃Na | H | CH₂OOCC₂H₅ |
| 5,6 | 2,4-di-COOH | CH₃ | 4-NHSO₂CH₃ | 5-OCH₂CH₂SO₄K | H | C₆H₄—p-OOCCH₃ |
| 6 | 4-OOCCH₃ | CH₃ | 4-OOCCH₃ | 5-OCH₂CH₂SO₄K | H | C₆H₁₀—4-CH₃ |
| 6 | 4-NHCOCH₃ | CH₃ | 7-CH₃ | 2-CH₃ | H | CH₂CH₂(C₄H₄O₂N) |
| 6 | 4-NHCOPh | CH₃ | 7-OCH₃ | 2-Ph | CH₃ | CH₂CH₂NO₂ |
| 6 | 4-C₂H₅ | CH₃ | 4-Ph | 2-NO₂ | CH₃ | C₆H₄—p-NO₂ |
| 6 | 4-Ph | H | H | 2-OCH₃ | CH₃ | CH₂NHOCCH₃ |
| 6 | 2,5-di-Cl | H | 4-SO₃Na | 5-NHCOCH₃ | C₂H₅ | CH₂NHSO₂CH₃ |
| 6 | 2-Cl—4-SO₂CH₃ | H | 4-SO₃Na | 3-NHSO₂CH₃ | C₂H₅ | C₆H₄—p-NHOCCH₃ |
| 6 | 4-NHSO₂CH₃ | H | 7-OCH₂CH₂SO₄K | 3-COOCH₃ | C₂H₅ | C₆H₄—p-NHSO₂CH₃ |
| 6 | 4-COOCH₃ | H | 7-OCH₂CH₂SO₄K | 3-COOH | C₂H₅ | C₆H₁₀—4-NHOCCH₃ |
| 6 | 2-OCH₃ | C₂H₅ | 4-NHCOPh | 2-Cl | CH₂CH₂Cl | CH₂CH₂Cl |
| 5 | 4-OC₂H₅ | C₂H₅ | 4-NHCOPh | 2,6-di-Br | C₆H₄—p-Br | C₆H₄—p-Br |
| 5 | 4-SO₃Na | C₂H₅ | 7-NHCOCH₃ | 2,6-di-Br | C₆H₄—p-CN | C₆H₄—p-CN |
| 5,6 | 2-SO₃Na | C₂H₅ | 7-OOCC₂H₅ | 2-OCH₃—5-NHCOCH₃ | CH₂CH₂CN | CH₂CH₂CN |
| 5,6 | 2-OCH₃—4-SO₃K | H | 4-COOH | 2-CH₂OOCCH₃ | CH₂CH₂OC₂H₅ | CH₂CH₂OC₂H₅ |
| 5,6 | 4-OCH₂CH₂OSO₃K | H | H | 2-CH₂Cl | CH₂CH₂OCH₂CH₂OC₂H₅ | CH₂CH₂OCH₂CH₂OC₂H₅ |
| 5,6 | 2-SO₃Na—5-Cl | H | 7-SO₂CH₃ | 2-CN | CH₂Ph | CH₂Ph |
| 6 | 4-Cl | H | 7-CF₃ | 2-OOCCH₃ | CH₂C₆H₁₁ | C₆H₄—o-OH |
| 6 | 4-OH | C₃H₇—n | 7-COOCH₃ | 5-COOH | H | CH₂CH₂OH |
| 6 | 4-CH₂OOCCH₃ | C₃H₇—n | 7-CHO | 5-OH | C₂H₅ | CH₂CH₂OH |
| 6 | 4-SO₃K | H | 7-CONH₂ | 5-CH₂CH=CH₂ | CH₂CH₂—SO₃K | CH₂CH₂—SO₃K |
| 6 | 4-OPh | H | 7-CONHCH₃ | 2-CH₃ | H | C₆H₄—p-OSO₃K |
| 6 | 4-NO₂ | H | 7-CONHPh | 5-COCH₃ | H | CH₂OPh |
| 5 | 4-CN | H | 7-CH₂Ph | 5-OCH₃ | H | CH₂SO₂NHPh |
| 5 | 4-COCH₃ | H | 7-CH₂SO₃K | 5-SO₃Na | CH₂SO₂NHCH₃ | CH₂SO₂NHCH₃ |
| 5 | 5-CH₃ | H | 7-C₆H₄—p-SO₃K | 5-OCH₂CH₂SO₄K | H | C₆H₄—p-SO₂NHCH₃ |
| 5 | 5-Ph | H | 7-CH₂CH₂OH | 5-OCH₂CH₂SO₃K | CH₂COOCH₃ | CH₂COOCH₃ |
| 5 | 5-OCH₃ | H | 7-CH₂Cl | 2-CH₃ | H | CH₂SO₂N(CH₃)₂ |
| 5 | 4,5-di-Br | C₄H₉—n | 7-C₆H₄—p-Br | 2-Ph | C₂H₅ | C₆H₄—p-NHCOOCH₃ |
| 5 | 5-COOH | H | H | 2-NO₂ | C₂H₅ | CH₂CH₂CONH₂ |
| 6 | H | H | 4-COCH₃ | 2-OCH₃ | C₂H₅ | C₆H₄—p-CONHCH₃ |
| 6 | 4-NO₂ | H | 4-NO₂ | 5-NHCOCH₃ | CH₂CH₂SCH₃ | CH₂CH₂SCH₃ |
| 6 | 4-CN | H | 4-Cl | 3-NHSO₂CH₃ | CH₂CH₂SCH₃ | C₆H₄—p-SCH₃ |
| 6 | 5-COCH₃ | CH₃ | 4-CN | 3-COOCH₃ | H | CH₂—C₆H₄—p-SCH₃ |
| 6 | 4-COPh | CH₃ | H | 3-COOH | CH₂SO₂C₂H₅ | CH₂SO₂C₂H₅ |

TABLE 4-continued

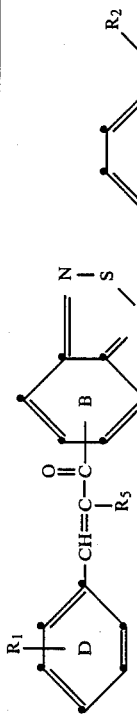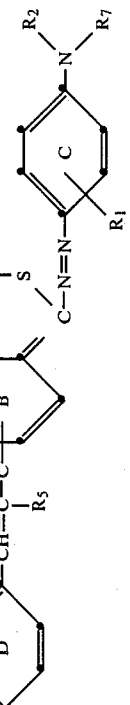

| Cinnamoyl Group Position | $R_1$ on D | $R_5$ | Substituents on B | $R_1$ on C | $R_2$ | $R_7$ |
|---|---|---|---|---|---|---|
| 6 | 2,4-di-COOH | $CH_3$ | 4-$NHSO_2CH_3$ | 2-Cl | H | $CH_2SO_2Ph$ |
| 6 | 4-OOCCH$_3$ | $CH_3$ | 7-$CH_3$ | 2,6-di-Br | H | $CH_2CH_2OSO_3K$ |
| 6 | 4-NHCOCH$_3$ | $CH_3$ | 7-OCH$_3$ | 2,6-di-Br | H | $C_6H_4$—p-$OSO_3K$ |
| 6,7 | 4-NHCOPh | $CH_3$ | 4-Ph | 2-OCH$_3$-5-NHCOCH$_3$ | H | $CH_2(C_8H_4O_2N)$ |
| 5 | 4-CH$_2$CH=CH$_2$ | H | H | 3-NHCOCH$_3$ | $C_2H_5$ | $C_2H_5$ |
| 6 | H | $CH_3$ | H | 3-OCPh | $C_2H_5$ | $C_2H_5$ |
| 6 | 4-CONH$_2$ | H | H | 5-CH$_2$CONHCH$_3$ | H | H |
| 6 | 3-SO$_2$NH$_2$ | H | 4-COCH$_3$ | 5-CH$_2$CON(CH$_3$)$_2$ | $C_2H_5$ | Ph |
| 5,6 | 4-SO$_2$NHCH$_3$ | $CH_3$ | 4-NO$_2$ | 5-CH$_2$CH$_2$OCH$_2$CH$_2$OC$_2$H$_5$ | $C_2H_5$ | $C_6H_{11}$ |
| 6 | 4-SO$_2$N(C$_2$H$_5$)$_2$ | H | 4-Cl | 5-CH$_2$SC$_2$H$_5$ | H | $CH_2$—CH=$CH_2$ |
| 7 | 4-SO$_3$C$_6$H$_5$ | $CH_3$ | 4-CN | 2-CH$_2$SC$_6$H$_5$ | H | $CH_2OOCC_2H_5$ |
| 5 | 4-SCH$_3$ | $CH_3$ | 4-NHSO$_2$CH$_3$ | 5-CH$_2$SO$_2$C$_2$H$_5$ | H | $C_6H_4$—p-OOCCH$_3$ |
| 6 | 2,4-di-SCN | $CH_3$ | 7-$CH_3$ | 5-CH$_2$SO$_2$C$_6$H$_5$ | H | $C_6H_{10}$—4-CH$_3$ |
| 6 | 4-SO$_2$C$_6$H$_5$ | $CH_3$ | 7-OCH$_3$ | 5-C$_6$H$_3$—9,p-di-CN | H | $CH_2CH_2(C_4H_4O_2N)$ |
| 6 | 2-CHO—4-CN | $CH_3$ | 4-Ph | 5-C$_6$H$_2$—o,m,p-tri—Cl | $CH_3$ | $CH_2CH_2NO_2$ |
| 4 | 4-CONHC$_2$H$_5$ | H | H | 5-OSO$_3$NH(CH$_3$)$_3$ | $CH_3$ | $C_6H_4$—p-$NO_2$ |
| 4 | 4-CON(C$_2$H$_5$)$_2$ | H | 4-SO$_3$Na | 5-OSO$_3$Na | $CH_3$ | $CH_2NHOCCH_3$ |
| 6 | 3-C$_6$H$_{11}$ | H | 4-SO$_3$Na | 2,6-di-OSO$_3$Na | $C_2H_5$ | $CH_2NSO_2CH_3$ |
| 6,7 | 3-SC$_6$H$_5$ | H | 7-OCH$_2$CH$_2$SO$_4$K | 2,6-di-SO$_3$NH(CH$_3$)$_3$ | $C_2H_5$ | $C_6H_4$—p-NHOCCH$_3$ |
| 6 | 4-NHSO$_2$C$_6$H$_5$ | H | 7-OCH$_2$CH$_2$SO$_4$K | 6-OSO$_3$NH(CH$_3$)$_3$ | $C_2H_5$ | $C_6H_4$—p-NHSO$_2$CH$_3$ |
| 6 | 4-SC$_6$H$_{11}$ | H | 4-NHCOPh | 5-SC$_6$H$_{11}$ | $C_2H_5$ | $C_6H_{10}$—4-NHOCCH$_3$ |
| 5 | 4-C$_6$H$_4$—p-CH$_3$ | $C_2H_5$ | 4-NHCOPh | 5-C$_6$H$_4$—p-CH$_3$ | $CH_2CH_2Cl$ | $CH_2CH_2Cl$ |
| 5 | 4-C$_6$H$_4$—p-CH$_2$CH=CH$_2$ | $C_2H_5$ | 7-NHCOCH$_3$ | 5-C$_6$H$_4$—p-CH$_2$CH=CH$_2$ | $C_6H_4$—p-Br | $C_6H_4$—p-Br |
| 6 | 4-OCH$_2$CH$_2$NO$_2$ | $C_2H_5$ | 7-OOCCH$_3$ | 5-OCH$_2$CH$_2$NO$_2$ | $C_6H_4$—p-CN | $C_6H_4$—p-CN |
| 6 | 2-CH$_2$NHCOCH$_3$ | $C_2H_5$ | 4-COOH | 2-CH$_2$NHCOCH$_3$ | $CH_2CH_2CN$ | $CH_2CH_2CN$ |
| 7 | 4-CH$_2$NHSO$_2$C$_2$H$_5$ | H | H | 5-CH$_2$NHSO$_2$C$_2$H$_5$ | $CH_2CH_2OC_2H_5$ | $CH_2CH_2OC_2H_5$ |
| 6,7 | 4-CH$_2$CH$_2$Cl | H | H | 5-CH$_2$CH$_2$Cl | $CH_2CH_2OCH_2CH_2OC_2H_5$ | $CH_2CH_2OCH_2CH_2OC_2H_5$ |
| 6 | 2,6-di-CH$_2$CN | H | 4-SO$_2$CH$_3$ | 2,6-di-CH$_2$CN | $CH_2Ph$ | $CH_2Ph$ |
| 6 | 4-CH$_2$CH$_2$OC$_2$H$_5$ | H | 4-C$_6$C$_6$H$_5$ | 5-COOH | $CH_2C_6H_{11}$ | $C_6H_4$—o-OH |
| 6 | 4-CH$_2$C$_6$H$_5$ | $C_3H_7$—n | 7-COOCH$_3$ | 5-COOH | H | $CH_2CH_2OH$ |
| 6 | 4-CH$_2$C$_6$H$_{11}$ | $C_3H_7$—n | 7-CHO | 5-CH$_2$SO$_3$K | $C_2H_5$ | $CH_2CH_2$—SO$_3$K |
| 6 | 4-CH$_2$CH(OH)CH$_2$OH | H | 7-CONH$_2$ | 5-CH$_2$CH(OH)CH$_2$OH | $CH_2CH_2$—SO$_3$K | $C_6H_4$—p-OSO$_3$K |
| 6 | 4-CH$_2$CH$_2$—SO$_3$K | H | 7-CONHCH$_3$ | 5-CH$_2$CH$_2$—SO$_3$K | H | $CH_2OPh$ |
| 6 | 4-CH$_2$OC$_6$H$_5$ | H | 7-OOCC$_6$H$_5$ | 5-CH$_2$OCC$_6$H$_5$ | H | $CH_2SO_2NHPh$ |
| 6 | 4-CH$_2$OOCC$_6$H$_5$ | H | 7-CH$_2$Ph | 5-CH$_2$OOCC$_6$H$_5$ | $CH_3SO_2NHCH_3$ | $CH_2SO_2NHCH_3$ |
| 5 | 5-CH$_2$COOCH$_3$ | H | 7-CH$_2$SO$_3$K | 5-CH$_2$COOCH$_3$ | H | $C_6H_4$—p-SO$_2$NHCH$_3$ |
| 6 | 4-C$_6$H$_4$—p-SO$_2$N(C$_2$H$_5$)$_2$ | H | 7-CH$_2$OSO$_3$K | 5-C$_6$H$_4$—p-SO$_2$N(C$_2$H$_5$)$_2$ | $CH_2COOCH_3$ | $CH_2COOCH_3$ |
| 6 | 4-CH$_2$CH$_2$NHCOOCH$_3$ | H | 7-C$_6$H$_4$—p-SO$_3$K | 5-CH$_2$CH$_2$NHCOOCH$_3$ | H | $CH_2SO_2N(CH_3)_2$ |
| 5,6 | 4-CH$_2$NHCONHCH$_3$ | H | 7-CH$_2$CH$_2$OH | 5-CH$_2$NHCONHCH$_3$ | $C_2H_5$ | $C_6H_4$—p-NHCOOCH$_3$ |
| 6 | 4-CH$_2$CONH$_2$ | H | 7-CH$_2$Cl | 5-CH$_2$CONH$_2$ | | |

TABLE 4-continued

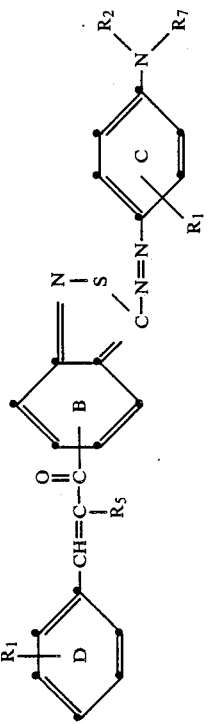

| Cinnamoyl Group Position | $R_1$ on D | $R_5$ | Substituents on B | $R_1$ on C | $R_2$ | $R_7$ |
|---|---|---|---|---|---|---|
| 6 | 5-CH$_2$CONHCH$_3$ | C$_4$H$_9$—n | 7-C$_6$H$_4$—p-Br | 5-CONH$_2$ | C$_2$H$_5$ | CH$_2$CH$_2$CONH$_2$ |
| 6 | 4-CH$_2$CON(CH$_3$)$_2$ | H | H | 3-SO$_2$NH$_2$ | C$_2$H$_5$ | C$_6$H$_4$—p-CONHCH$_3$ |
| 6 | 4-CH$_2$CH$_2$OCH$_2$CH$_2$OC$_2$H$_5$ | H | 4-COCH$_3$ | 5-SO$_2$NHCH$_3$ | C$_2$H$_5$ | C$_6$H$_4$—p-SCH$_3$ |
| 6 | 4-CH$_2$SC$_2$H$_5$ | H | 4-NO$_2$ | 5-SO$_2$N(C$_2$H$_5$)$_2$ | CH$_2$CH$_2$SCH$_3$ | CH$_2$CH$_2$SCH$_3$ |
| 6 | 5-CH$_2$SC$_6$H$_5$ | H | 4-Cl | 5-SO$_3$C$_6$H$_5$ | H | CH$_2$—C$_6$H$_4$—p-SCH$_3$ |
| 6 | 4-CH$_2$SO$_2$C$_2$H$_5$ | CH$_3$ | 4-CN | 5-SCH$_3$ | CH$_2$SO$_2$C$_2$H$_5$ | CH$_2$SO$_2$C$_2$H$_5$ |
| 6 | 2,4-di-CH$_2$SO$_2$C$_6$H$_5$ | CH$_3$ | 4-NHSO$_2$CH$_3$ | 2,5-di-SCN | H | CH$_2$SO$_2$Ph |
| 6 | 4-C$_6$H$_3$—o,p-di-CN | CH$_3$ | 7-CH$_3$ | 5-SO$_2$C$_6$H$_5$ | H | CH$_2$CH$_2$OSO$_3$K |
| 6 | 4-C$_6$H$_3$—o,m,p-tri-Cl | CH$_3$ | 7-OCH$_3$ | 2-CHO—5-CN | H | C$_6$H$_4$—p-OSO$_3$K |
| 6 | 2,6-di-OSO$_3$Na | H | 4-Ph | 5-CONHC$_2$H$_5$ | H | CH$_2$—(C$_8$H$_4$O$_2$N) |
| 6 | H | H | 7-CH$_2$(C$_4$H$_4$O$_2$N) | 5-CON(C$_2$H$_5$)$_2$ | C$_2$H$_5$ | C$_2$H$_5$ |
| 6 | H | H | 7-CH$_2$(C$_4$H$_3$O) | 3-C$_6$H$_{11}$ | C$_2$H$_5$ | C$_2$H$_5$ |
| 6 | 5-CH$_2$(C$_8$H$_4$O$_2$N) | H | H | 3-SC$_6$H$_5$ | C$_2$H$_5$ | C$_2$H$_5$ |
| 6 | 5-CH$_2$(C$_4$H$_3$O) | H | H | 3-NHSO$_2$C$_6$H$_5$ | C$_2$H$_5$ | C$_2$H$_5$ |

TABLE 5

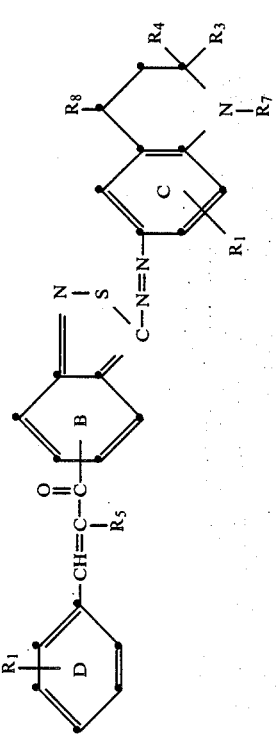

| Cinnamoyl Group Position | R₁ on D | R₅ | Substituents on B | R₁ on C | R₃ | R₄ | R₈ | R₇ |
|---|---|---|---|---|---|---|---|---|
| 6 | H | H | H | H | H | H | H | H |
| 6 | 4-NO₂ | H | 4-COCH₃ | 7-CH₃ | CH₃ | CH₃ | CH₃ | Ph |
| 6 | 4-CN | H | 4-NO₂ | 7-OCH₃ | CH₃ | CH₃ | H | CH₂—CH=CH₂ |
| 6,7 | 5-COCH₃ | CH₃ | 4-Cl | 7-SO₃Na | CH₃ | CH₃ | H | CH₂OOC₂H₅ |
| 7 | 4-COPh | CH₃ | 4-CN | 7-OCH₂CH₂SO₄K | CH₃ | CH₃ | H | C₆H₄—p-OOCCH₃ |
| 5 | 2,4-di-COOH | CH₃ | 4-NHSO₂CH₃ | 5-OCH₂CH₂SO₄K | CH₃ | CH₃ | H | C₆H₁₀—4-CH₃ |
| 6 | 4-OOCCH₃ | CH₃ | 7-CH₃ | 7-CH₃ | CH₃ | CH₃ | H | CH₂CH₂(C₄H₄O₂N) |
| 6 | 4-NHCOCH₃ | CH₃ | 7-OCH₃ | 7-Ph | CH₃ | CH₃ | H | CH₂CH₂NO₂ |
| 6 | 4-NHCOPh | CH₃ | 4-Ph | 7-NO₂ | CH₃ | CH₃ | H | C₆H₄—p-NO₂ |
| 4 | 4-C₂H₅ | H | H | 7-OCH₃ | CH₃ | CH₃ | H | CH₂NHOCCH₃ |
| 6 | 4-Ph | H | 4-SO₃Na | 7-NHCOCH₃ | CH₃ | CH₃ | H | CH₂NHSO₂CH₃ |
| 6 | 2,5-di-Cl | H | 4-SO₃Na | 7-NHSO₂CH₃ | CH₃ | C₂H₅ | C₂H₅ | C₆H₄—p-NHOCCH₃ |
| 6 | 2-Cl—4-SO₂CH₃ | C₂H₅ | 7-OCH₂CH₂SO₄K | 7-COOCH₃ | CH₃ | CH₃ | CH₃ | C₆H₄—p-NHSO₂CH₃ |
| 6 | 4-NHSO₂CH₃ | C₂H₅ | 7-OCH₂CH₂SO₄K | 7-COOH | H | H | H | C₆H₁₀—4-NHOCCH₃ |
| 6 | 4-COOCH₃ | C₂H₅ | 4-NHCOPh | 7-Cl | CH₃ | CH₃ | H | CH₂CH₂Cl |
| 6 | 2-OCH₃ | H | 4-NHCOPh | 5,7-di-Br | CH₃ | CH₃ | H | C₆H₄—p-Br |
| 5 | 4-OC₂H₅ | H | 7-NHCOCH₃ | 5,7-di-Br | CH₃ | CH₃ | H | C₆H₄—p-CN |
| 4 | 4-SO₃Na | H | 7-OOCC₂H₅ | 5-OCH₃—7-NHCOCH₃ | CH₃ | CH₃ | H | CH₂CH₂CN |
| 6 | 2-SO₃Na | H | 4-COOH | 7-CH₂OOCCH₃ | CH₃ | CH₃ | H | CH₂CH₂OC₂H₅ |
| 7 | 2-OCH₃—4-SO₃K | H | H | 7-CH₂Cl | CH₃ | CH₃ | H | CH₂CH₂OCH₂CH₂OC₂H₅ |
| 6,7 | 4-OCH₂CH₂OSO₃K | H | H | 7-CN | CH₃ | CH₃ | H | CH₂Ph |
| 6 | 2-SO₃Na—5-Cl | H | 7-SO₂CH₃ | 7-OOCCH₃ | CH₃ | CH₃ | H | CH₂C₆H₁₁ |
| 6 | 4-Cl | C₃H₇—n | 7-CF₃ | 7-COOH | CH₃ | CH₃ | H | C₆H₄—o-OH |
| 6 | 4-OH | C₃H₇—n | 7-COOCH₃ | 7-OH | CH₃ | CH₃ | H | CH₂C₆H₄OH |
| 6 | 4-CH₂OOCCH₃ | H | 7-CHO | 7-CH₂CH=CH₂ | CH₃ | CH₃ | H | CH₂—SO₃K |
| 6 | 4-SO₃K | H | 7-CONH₂ | 7-CH₃ | CH₃ | CH₃ | H | C₆H₄—p-OSO₃K |
| 6 | 4-OPh | H | 7-CONHCH₃ | 7-COCH₃ | CH₃ | CH₃ | H | CH₂OPh |
| 6 | 4-NO₂ | H | 7-CH₂Ph | 7-SO₃Na | CH₃ | C₂H₅ | C₂H₅ | CH₂SO₂NHPh |
| 5-CN | 5-CN | H | 7-CH₂SO₃K | 7-COCH₃ | H | H | H | CH₂SO₂NHCH₃ |
| 6 | 4-COCH₃ | H | 7-CH₂OSO₃K | 7-OCH₂CH₂SO₄K | CH₃ | CH₃ | CH₃ | CH₂SO₂N(CH₃)₂ |
| 6 | 5-CH₃ | H | 7-C₆H₄—p-SO₃K | 7-OCH₂CH₂SO₃K | CH₃ | CH₃ | H | C₆H₄—p-SO₂NHCH₃ |
| 6 | 5-Ph | H | 7-CH₂CH₂OH | 7-CH₃ | CH₃ | CH₃ | H | CH₂COOCH₃ |
| 6 | 5-OCH₃ | H | 7-CH₂Cl | 7-Ph | CH₃ | CH₃ | H | C₆H₄—p-NHCOOCH₃ |
| 6 | 4,5-di-Br | C₄H₉—n | 7-C₆H₄—p-Br | 7-NO₂ | CH₃ | CH₃ | H | CH₂CONH₂ |
| 6 | 5-COOH | H | H | 7-OCH₃ | CH₃ | CH₃ | CH₃ | C₆H₄—p-CONHCH₃ |

TABLE 5-continued

| Cinnamoyl Group Position | R₁ on D | R₅ | Substituents on B | R₁ on C | R₃ | R₄ | R₈ | R₇ |
|---|---|---|---|---|---|---|---|---|
| 6 | 4-NO₂ | H | 4-COCH₃ | 7-NHCOCH₃ | CH₃ | CH₃ | H | $C_6H_4$—p-SCH₃ |
| 6 | 4-CN | H | 4-NO₂ | 7-NHSO₂CH₃ | CH₃ | CH₃ | H | CH₂CH₂SCH₃ |
| 6 | 5-COCH₃ | CH₃ | 4-Cl | 7-COOCH₃ | CH₃ | CH₃ | H | CH₂—C₆H₄—p-SCH₃ |
| 6 | 4-COPh | CH₃ | 4-CN | 7-COOH | CH₃ | CH₃ | H | CH₂SO₂C₂H₅ |
| 6 | 2,4-di-COOH | CH₃ | 4-NHSO₂CH₃ | 7-Cl | CH₃ | H | H | CH₂SO₂Ph |
| 6 | 4-OOCCH₃ | CH₃ | 7-CH₃ | 7,8-di-Br | CH₃ | H | H | CH₂CH₂OSO₃K |
| 6 | 4-NHCOCH₃ | CH₃ | 7-OCH₃ | 7,8-di-Br | CH₃ | H | H | $C_6H_4$—p-OSO₃K |
| 6 | 4-NHCOPh | CH₃ | 4-Ph | 7-OCH₃—8-NHCOCH₃ | CH₃ | H | H | CH₂(C₈H₄O₂N) |
| 5 | 4-CH₂CH=CH₂ | H | H | 7-NHCOCH₃ | C₂H₅ | CH₃ | H | C₂H₅ |
| 5,6 | H | CH₃ | H | 7-OCPh | C₂H₅ | CH₃ | CH₃ | C₂H₅ |
| 6 | 4-CONH₂ | H | 4-COCH₃ | 7-CH₂CONHCH₃ | H | CH₃ | H | H |
| 6 | 3-SO₂NH₂ | CH₃ | 4-NO₂ | 7-CH₂CON(CH₃)₂ | CH₃ | CH₃ | H | Ph |
| 6 | 4-SO₂NHCH₃ | CH₃ | 4-Cl | 7-CH₂CH₂OCH₂CH₂OC₂H₅ | CH₃ | CH₃ | H | $C_6H_{11}$ |
| 6 | 4-SO₂N(C₂H₅)₂ | CH₃ | 4-CN | 7-CH₂SC₂H₅ | CH₃ | CH₃ | H | CH₂—CH=CH₂ |
| 6,7 | 4-SO₃C₆H₅ | CH₃ | 4-NHSO₂CH₃ | 7-CH₂SC₆H₅ | CH₃ | CH₃ | H | CH₂OOCC₂H₅ |
| 5 | 4-SCH₃ | CH₃ | 7-CH₃ | 7-CH₂SO₂C₂H₅ | CH₃ | CH₃ | H | $C_6H_4$—p-OOCCH₃ |
| 6 | 2,4-di-SCN | CH₃ | 7-OCH₃ | 7-CH₂SO₂C₆H₅ | CH₃ | CH₃ | H | $C_6H_{10}$—4-CH₃ |
| 6 | 4-SO₂C₂H₅ | CH₃ | 4-Ph | 7-C₆H₄—o,p-di-CN | CH₃ | CH₃ | H | CH₂CH₂—(C₄H₄O₂N) |
| 6 | 2-CHO—4-CN | CH₃ | H | 7-C₆H₁—o,m,p-tri-Cl | CH₃ | CH₃ | H | CH₂CH₂NO₂ |
| 4 | 4-CONHC₂H₅ | CH₃ | 4-SO₃Na | 5,7-di-OSO₃NH(CH₃)₃ | CH₃ | CH₃ | H | CH₂NHOCCH₃ |
| 6 | 4-CON(C₂H₅)₂ | CH₃ | 4-SO₃Na | 5,7-di-OSO₃Na | CH₃ | CH₃ | H | CH₂NHSO₂CH₃ |
| 6 | 3-C₆H₁₁ | H | 7-OCH₂CH₂SO₄K | 5-OSO₃N(CH₃)₃ | CH₃ | CH₃ | H | $C_6H_4$—p-NHOCCH₃ |
| 6 | 3-SC₆H₅ | H | 7-OCH₂CH₂SO₄K | 5,7-di-OSO₃Na | CH₃ | C₂H₅ | C₂H₅ | $C_6H_4$—p-NHSO₂CH₃ |
| 6 | 4-NHSO₂C₆H₅ | H | 4-NHCOPh | 7-SC₆H₁₁ | CH₃ | CH₃ | CH₃ | $C_6H_{10}$—4-NHCOCH₃ |
| 6 | 4-SC₆H₁₁ | H | 4-NHCOPh | 7-C₆H₄—p-CH₃ | H | CH₃ | H | CH₂CH₂Cl |
| 5 | $C_6H_4$—p-CH₃ | C₂H₅ | 4-NHCOCH₃ | 7-C₆H₄—p-CH₂CH=CH₂ | CH₃ | CH₃ | H | $C_6H_4$—p-Br |
| 6 | $C_6H_4$—p-CH₂CH=CH₂ | C₂H₅ | 4-NHCOCH₃ | 7-OCH₂CH₂NO₂ | CH₃ | CH₃ | H | $C_6H_4$—p-CN |
| 6 | 4-OCH₂CH₂NO₂ | C₂H₅ | 7-NHCOCH₃ | 7-CH₂NHSO₂CH₃ | CH₃ | CH₃ | H | CH₂CH₂CN |
| 5 | 2-CH₂NHCOCH₃ | C₂H₅ | 7-OOCC₂H₅ | 7-CH₂NHSO₂C₂H₅ | CH₃ | CH₃ | H | CH₂CH₂OC₂H₅ |
| 6 | 4-CH₂NHSO₂C₂H₅ | H | 4-COOH | 7-CH₂CH₂Cl | CH₃ | CH₃ | H | CH₂CH₂OC₂H₅ |
| 7 | 4-CH₂CH₂Cl | H | H | 7-CH₂CH₂CN | CH₃ | CH₃ | H | CH₂CH₂OCH₂CH₂OC₂H₅ |
| 6,7 | 4-CH₂CH₂CN | H | 7-SO₂CH₃ | 5,7-di-CH₂CN | CH₃ | CH₃ | H | CH₂Ph |
| 6 | 2,6-di-CH₂CN | H | 4-CH₂C₆H₅ | 7-COOH | CH₃ | CH₃ | H | $CH_2C_6H_{11}$ |
| 6 | 4-CH₂—C₆H₅ | H | 7-COOCH₃ | 7-CH₂CH₂OC₂H₅ | CH₃ | H | H | $C_6H_4$—o-OH |
| 6 | 4-CH₂C₆H₁₁ | C₃H₇—n | 7-CHO | 7-CH₂C₆H₁₁ | CH₃ | H | H | CH₂CH₂OH |
| 6 | 4-CH₂CH(OH)CH₂OH | C₃H₇—n | | 7-CH₂CH(OH)CH₂OH | CH₃ | H | H | CH₂CH₂—SO₃K |

TABLE 5-continued

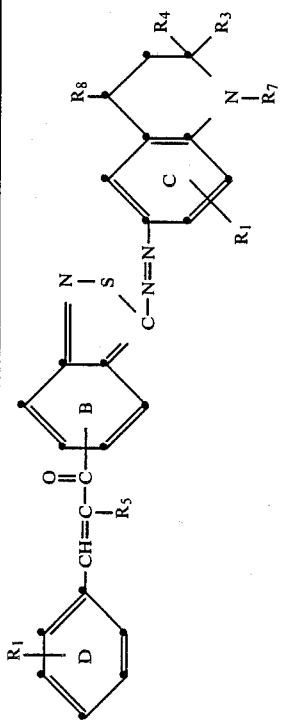

| Cinnamoyl Group Position | R₁ on D | R₅ | Substituents on B | R₁ on C | R₃ | R₄ | R₈ | R₇ |
|---|---|---|---|---|---|---|---|---|
| 6 | 4-CH₂CH₂—SO₃K | H | 7-CONH₂ | 7-CH₂CH₂—SO₃K | CH₃ | H | H | C₆H₄—p-OSO₃K |
| 6 | 4-CH₂OC₆H₅ | H | 7-CONHCH₃ | 7-CH₂OC₆H₅ | CH₃ | C₂H₅ | C₂H₅ | CH₂OPh |
| 6 | 4-CH₂OOCC₆H₅ | H | 7-CH₂Ph | 7-CH₂OOCC₆H₅ | H | CH₃ | H | CH₂SO₂NHPh |
| 6 | 5-CH₂COOCH₃ | H | 7-CH₂SO₃K | 7-CH₂COOCH₃ | CH₃ | CH₃ | CH₃ | CH₂SO₂NHCH₃ |
| 6 | 4-C₆H₄—p-SO₂N(C₂H₅)₂ | H | 7-CH₂OSO₃K | 7-C₆H₄—p-SO₂N(C₂H₅)₂ | CH₃ | CH₃ | H | C₆H₄—p-SO₂NHCH₃ |
| 6 | 4-CH₂CH₂NHCOOCH₃ | H | 7-C₆H₄—p-SO₃K | 7-CH₂CH₂NHCOOCH₃ | CH₃ | CH₃ | H | CH₂COOCH₃ |
| 6 | 4-CH₂NHCONHCH₃ | H | 7-CH₂CH₂OH | 7-CH₂NHCONHCH₃ | CH₃ | CH₃ | H | CH₂SO₂N(CH₃)₂ |
| 6 | 4-CH₂CONH₂ | H | 7-CH₂Cl | 7-CH₂CONH₂ | H | H | H | C₆H₄—p-NHCOOCH₃ |
| 6 | 5-CH₂CONHCH₃ | C₄H₉—n | 7-C₆H₄—p-Br | 7-CONH₂ | CH₃ | CH₃ | H | CH₂CH₂CONH₂ |
| 6 | 4-CH₃CON(CH₃)₂ | H | H | 7-SO₂NH₂ | CH₃ | CH₃ | CH₃ | C₆H₄—p-CONHCH₃ |
| 6 | 4-CH₂CH₂OCH₂CH₂OC₂H₅ | H | 4-COCH₃ | 7-SO₂NHCH₃ | CH₃ | CH₃ | H | C₆H₄—p-SCH₃ |
| 6 | 4-CH₂SC₂H₅ | H | 4-NO₂ | 7-SO₂N(C₂H₅)₂ | CH₃ | CH₃ | H | CH₂SC₆H₅ |
| 6 | 5-CH₂SC₆H₅ | H | 4-Cl | 7-SO₃C₆H₅ | CH₃ | CH₃ | H | CH₂—C₆H₄—p-SCH₃ |
| 6,7 | 4-di-CH₂SO₂C₆H₅ | CH₃ | 4-CN | 7-SCH₃ | CH₃ | H | H | CH₂SO₂C₂H₅ |
| 6 | 2,4-CH₂SO₂C₆H₅ | CH₃ | 4-NHSO₂CH₃ | 5,7-di-SCH | CH₃ | H | H | CH₂SO₂Ph |
| 6 | 4-C₆H₃—o,p-di-CN | CH₃ | 4-CH₃ | 7-SO₂C₆H₅ | CH₃ | H | H | CH₂CH₂OSO₃K |
| 6 | 4-C₆H₂—o,m,p-tri-Cl | CH₃ | 7-OCH₃ | 5-CHO—7-CN | CH₃ | H | H | C₆H₄—p-OSO₃K |
| 6 | 2,6-di-OSO₃Na | H | 4-Ph | 7-CONHC₂H₅ | CH₃ | H | H | CH₂(C₈H₄O₂N) |
| 6 | H | H | 7-CH₂(C₄H₄O₂N) | 7-CON(C₂H₅)₂ | CH₃ | H | H | C₂H₅ |
| 6 | H | H | 7-CH₂(C₄H₃O) | 7-C₆H₁₁ | CH₃ | CH₃ | H | C₂H₅ |
| 6 | 5-CH₂(C₈H₄O₂N) | H | H | 7-SC₆H₅ | CH₃ | CH₃ | H | C₂H₅ |
| 6 | 5-CH₂(C₄H₃O) | H | H | 7-NHSO₂C₆H₅ | CH₃ | C₂H₅ | C₂H₅ | C₂H₅ |

TABLE 6

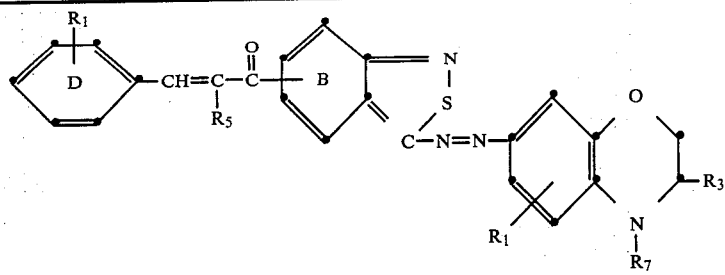

| Cinnamoyl Group Position | $R_1$ on D | $R_5$ | Substituents on B | $R_1$ on C | $R_3$ | $R_7$ |
|---|---|---|---|---|---|---|
| 6 | H | H | H | H | $CH_3$ | Ph |
| 6 | 4-$NO_2$ | H | 4-$COCH_3$ | 6-$CH_3$ | $CH_3$ | Ph |
| 6 | 4-CN | H | 4-$NO_2$ | 6-$COCH_3$ | $C_2H_5$ | $C_6H_{11}$ |
| 6 | 5-$COCH_3$ | H | 4-Cl | 6-$OCH_3$ | H | $CH_2-CH=CH_2$ |
| 7 | 4-COPh | $CH_3$ | 4-CN | 6-$SO_3Na$ | H | $CH_2OOCC_2H_5$ |
| 5 | 2,4-di-COOH | $CH_3$ | 4-$NHSO_2CH_3$ | 6-$OCH_2CH_2SO_4K$ | H | $C_6H_4-p-OOCCH_3$ |
| 6 | 4-OOCCH_3 | $CH_3$ | 7-$CH_3$ | 6-$OCH_2CH_2SO_4K$ | H | $C_6H_{10}-4-CH_3$ |
| 6 | 4-$NHCOCH_3$ | $CH_3$ | 7-$OCH_3$ | 6-$CH_3$ | H | $CH_2CH_2(C_4H_4O_2N)$ |
| 6 | 4-NHCOPh | $CH_3$ | 4-Ph | 6-Ph | $CH_3$ | $CH_2CH_2NO_2$ |
| 4,6 | 4-$C_2H_5$ | $CH_3$ | H | 6-$NO_2$ | $CH_3$ | $C_6H_4-p-NO_2$ |
| 6 | 4-Ph | H | H | 6-$OCH_3$ | $CH_3$ | $CH_2NHOCCH_3$ |
| 6 | 2,5-Cl | H | 4-$SO_3Na$ | 6-$NHCOCH_3$ | $C_2H_5$ | $CH_2NHSO_2CH_3$ |
| 6 | 2-Cl-4-$SO_2CH_3$ | H | 4-$SO_3Na$ | 6-$NHSO_2CH_3$ | $CH_3$ | $C_6H_4-p-NHOCCH_3$ |
| 6 | 4-$NHSO_2CH_3$ | H | 7-$OCH_2CH_2SO_4K$ | 6-$COOCH_3$ | $CH_3$ | $C_6H_4-p-NHSO_2CH_3$ |
| 6 | 4-$COOCH_3$ | H | 7-$OCH_2CH_2SO_4K$ | 6-COOH | H | $C_6H_{10}-4-NHOCCH_3$ |
| 6 | 2-$OCH_3$ | $C_2H_5$ | 4-NHCOPh | 6-Cl | $CH_3$ | $CH_2CH_2Cl$ |
| 5 | 4-$OC_2H_5$ | $C_2H_5$ | 4-NHCOPh | 6,8-di-Br | $C_2H_5$ | $C_6H_4-p-Br$ |
| 6 | 4-$SO_3Na$ | $C_2H_5$ | 7-$NHCOCH_3$ | 6,8-di-Br | H | $C_6H_4-p-CN$ |
| 6 | 2-$SO_3Na$ | $C_2H_5$ | 7-$OOCC_2H_5$ | 6-$OCH_3$-8-$NHCOCH_3$ | H | $CH_2CH_2CN$ |
| 7 | 2-$OCH_3$-4-$SO_3K$ | H | 4-COOH | 6-$CH_2OOCCH_3$ | H | $CH_2CH_2OC_2H_5$ |
| 6 | 4-$OCH_2CH_2OSO_3K$ | H | H | 6-$CH_2Cl$ | H | $CH_2CH_2OCH_2CH_2OC_2H_5$ |
| 6 | 2-$SO_3Na$-5-Cl | H | H | 6-CN | H | $CH_2Ph$ |
| 6 | 4-Cl | H | 7-$SO_2CH_3$ | 6-$OOCCH_3$ | $CH_3$ | $CH_2C_6H_{11}$ |
| 6 | 4-OH | H | 7-$CF_3$ | 6-COOH | $CH_3$ | $C_6H_4-o-OH$ |
| 6 | 4-$CH_2OOCCH_3$ | $C_3H_7-n$ | 7-COOCH_3 | 6-OH | $CH_3$ | $CH_2CH_2OH$ |
| 5,6 | 4-$SO_3K$ | $C_3H_7-n$ | 7-CHO | 6-$CH_2CH=CH_2$ | $C_2H_5$ | $CH_2CH_2-SO_3K$ |
| 6 | 4-OPh | H | 7-$CONH_2$ | 6-$CH_3$ | $CH_3$ | $C_6H_4-p-OSO_3K$ |
| 6 | 4-$NO_2$ | H | 7-$CONHCH_3$ | 6-$COCH_3$ | $CH_3$ | $CH_2OPh$ |
| 6 | 5-CN | H | 7-$CH_2Ph$ | 6-$OCH_3$ | H | $CH_2SO_2NHPh$ |
| 6 | 4-$COCH_3$ | H | 7-$CH_2SO_3K$ | 6-$SO_3Na$ | $CH_3$ | $CH_2SO_2NHCH_3$ |
| 6 | 5-$CH_3$ | H | 7-$CH_2OSO_3K$ | 6-$OCH_2CH_2SO_4K$ | H | $C_6H_4-p-SO_2NHCH_3$ |
| 6 | 5-Ph | H | 7-$C_6H_4-p-SO_3K$ | 6-$OCH_2CH_2SO_3K$ | H | $CH_2COOCH_3$ |
| 6 | 5-$OCH_3$ | H | 7-$CH_2CH_2OH$ | 6-$CH_3$ | H | $CH_2SO_2N(CH_3)_2$ |
| 6 | 4,5-di-Br | H | 7-$CH_2Cl$ | 6-Ph | H | $C_6H_4-p-NHCOOCH_3$ |
| 6 | 5-COOH | $C_4H_9-n$ | 7-$C_6H_4-p-Br$ | 6-$NO_2$ | $C_2H_5$ | $CH_2CH_2CONH_2$ |
| 6 | H | H | H | 6-$OCH_3$ | $C_2H_5$ | $C_6H_4-p-CONHCH_3$ |
| 6 | 4-$NO_2$ | H | 4-$COCH_3$ | 6-$NHCOCH_3$ | $CH_3$ | $C_6H_4-p-SCH_3$ |
| 6 | 4-CN | H | 4-$NO_2$ | 6-$NHSO_2CH_3$ | $C_3H_7-n$ | $CH_2CH_2SCH_3$ |
| 6 | 5-$COCH_3$ | H | 4-Cl | 6-$COOCH_3$ | H | $CH_2-C_6H_4-p-SCH_3$ |
| 6 | 4-COPh | $CH_3$ | 4-CN | 6-COOH | $CH_3$ | $CH_2SO_2C_2H_5$ |
| 6 | 2,4-di-COOH | $CH_3$ | 4-$NHSO_2CH_3$ | 6-Cl | H | $CH_2SO_2Ph$ |
| 6 | 4-OOCCH_3 | $CH_3$ | 7-$CH_3$ | 5,6-di-Br | H | $CH_2CH_2OSO_3K$ |
| 6 | 4-$NHCOCH_3$ | $CH_3$ | 7-$OCH_3$ | 6,8-di-Br | H | $C_6H_4-p-OSO_3K$ |
| 6 | 4-NHCOPh | $CH_3$ | 4-Ph | 6-$OCH_3$-8-$NHCOCH_3$ | H | $CH_2(C_8H_4O_2N)$ |
| 5 | 4-$CH_2CH=CH_2$ | H | H | 6-$NHCOCH_3$ | $C_2H_5$ | $C_2H_5$ |
| 6,7 | H | $CH_3$ | H | 6-OCPh | $C_2H_5$ | $C_2H_5$ |
| 6 | 4-$CONH_2$ | H | H | 6-$CH_2CONHCH_3$ | H | H |
| 6 | 3-$SO_2NH_2$ | H | 4-$COCH_3$ | 6-$CH_2CON(CH_3)_2$ | $CH_3$ | Ph |
| 6 | 4-$SO_2NHCH_3$ | H | 4-$NO_2$ | 6-$CH_2CH_2OCH_2CH_2OC_2H_5$ | $C_2H_5$ | $C_6H_{11}$ |
| 6 | 4-$SO_2N(C_2H_5)_2$ | H | 4-Cl | 6-$CH_2SC_2H_5$ | H | $CH_2-CH=CH_2$ |
| 7 | 4-$SO_3C_6H_5$ | $CH_3$ | 4-CN | 6-$CH_2SC_6H_5$ | H | $CH_2OOCC_2H_5$ |
| 5 | 4-$SCH_3$ | $CH_3$ | 4-$NHSO_2CH_3$ | 6-$CH_2SO_2C_2H_5$ | H | $C_6H_4-p-OOCCH_3$ |
| 6 | 2,4-di-SCN | $CH_3$ | 7-$CH_3$ | 6-$CH_2SO_2C_6H_5$ | H | $C_6H_{10}-4-CH_3$ |
| 6 | 4-$SO_2C_6H_5$ | $CH_3$ | 7-$OCH_3$ | 6-$C_6H_3-o,p$-di-CN | H | $CH_2CH_2-(C_4H_4O_2N)$ |
| 6 | 2-CHO-4-CN | $CH_3$ | 4-Ph | 6-$C_6H_2-o,m,p$-tri-Cl | $CH_3$ | $CH_2CH_2NO_2$ |
| 4 | 4-$CONHC_2H_5$ | $CH_3$ | H | 5,6-di-$OSO_3NH(CH_3)_3$ | $CH_3$ | $C_6H_4-p-NO_2$ |
| 6 | 4-$CON(C_2H_5)_2$ | H | H | 5,6-di-$SO_3NH(CH_3)_3$ | $CH_3$ | $CH_2NHOCCH_3$ |
| 6 | 3-$C_6H_{11}$ | H | 4-$SO_3Na$ | 6-$OSO_3NH(CH_3)_3$ | $C_2H_5$ | $CH_2NHSO_2CH_3$ |
| 6 | 3-$SC_6H_5$ | H | 4-$SO_3Na$ | 6,8-di-$OSO_3Na$ | $CH_3$ | $C_6H_4-p-NHOCCH_3$ |
| 6 | 4-$NHSO_2C_6H_5$ | H | 7-$OCH_2CH_2SO_4K$ | 6-$SO_3NH(CH_3)_3$ | $CH_3$ | $C_6H_4-p-NHSO_2CH_3$ |
| 6 | 4-$SC_6H_{11}$ | H | 7-$OCH_2CH_2SO_4K$ | 6-$SC_6H_{11}$ | H | $C_6H_{10}-4-NHOCCH_3$ |
| 6 | 4-$C_6H_4-p-CH_3$ | $C_2H_5$ | 4-NHCOPh | 6-$C_6H_4-p-CH_3$ | $CH_3$ | $CH_2CH_2Cl$ |

TABLE 6-continued

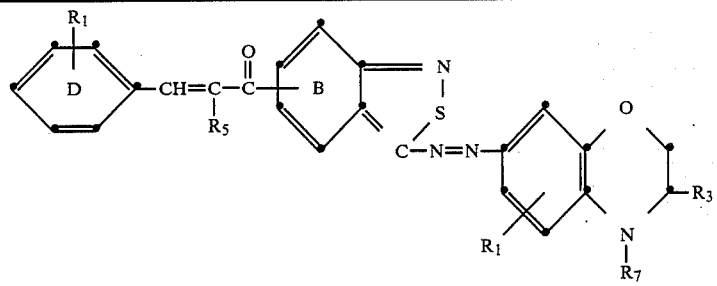

| Cinnamoyl Group Position | R₁ on D | R₅ | Substituents on B | R₁ on C | R₃ | R₇ |
|---|---|---|---|---|---|---|
| 5 | 4-C₆H₄—p-CH₂CH=CH₂ | C₂H₅ | 4-NHCOPh | 6-C₆H₄—p-CH₂CH=CH₂ | C₂H₅ | C₆H₄—p-Br |
| 6 | 4-OCH₂CH₂NO₂ | C₂H₅ | 7-NHCOCH₃ | 6-OCH₂CH₂NO₂ | H | C₆H₄—p-CN |
| 6 | 2-CH₂NHCOCH₃ | C₂H₅ | 7-OOCC₂H₅ | 6-CH₂NHCOCH₃ | H | CH₂CH₂CN |
| 7 | 4-CH₂NHSO₂C₂H₅ | H | 4-COOH | 6-CH₂NHSO₂C₂H₅ | H | CH₂CH₂OC₂H₅ |
| 6 | 4-CH₂CH₂Cl | H | H | 6-CH₂CH₂Cl | H | CH₂CH₂OCH₂CH₂OC₂H₅ |
| 6,7 | 2,6-di-CH₂CN | H | H | 6,8-di-CH₂CN | H | CH₂Ph |
| 6 | 4-CH₂CH₂OC₂H₅ | H | 7-SO₂CH₃ | 6-CH₂CH₂OC₂H₅ | CH₃ | CH₂C₆H₁₁ |
| 6 | 4-CH₂C₆H₅ | H | 4-CH₂C₆H₅ | 6-COOH | CH₃ | C₆H₄—o-OH |
| 6 | 4-CH₂C₆H₁₁ | C₃H₇—n | 7-COOCH₃ | 6-CH₂C₆H₁₁ | CH₃ | CH₂CH₂OH |
| 6 | 4-CH₂CH(OH)CH₂OH | C₃H₇—n | 7-CHO | 6-CH₂CH(OH)CH₂OH | C₂H₅ | CH₂CH₂—SO₃K |
| 6 | 4-CH₂CH₂—SO₃K | H | 7-CONH₂ | 6-CH₂CH₂—SO₃K | CH₃ | C₆H₄—p-OSO₃K |
| 6 | 4-CH₂OC₆H₅ | H | 7-CONHCH₃ | 6-CH₂OC₆H₅ | CH₃ | CH₂OPh |
| 6 | 4-CH₂OOCC₆H₅ | H | 7-CH₂Ph | 6-CH₂OOCC₆H₁₁ | H | CH₂SO₂NHPh |
| 6 | 5-CH₂COOCH₃ | H | 7-CH₂SO₃K | 6-CH₂COOCH₃ | CH₃ | CH₂SO₂NHCH₃ |
| 6 | 4-C₆H₄—p-SO₂N(C₂H₅)₂ | H | 7-CH₂OSO₃K | 6-C₆H₄—p-SO₂N(C₂H₅)₂ | H | C₆H₄—p-SO₂NHCH₃ |
| 6 | 4-CH₂CH₂NHCOOCH₃ | H | 7-C₆H₄—p-SO₃K | 6-CH₂CH₂NHCOOCH₃ | H | CH₂COOCH₃ |
| 6 | 4-CH₂NHCONHCH₃ | H | 7-CH₂CH₂OH | 6-CH₂NHCONHCH₃ | H | CH₂SO₂N(CH₃)₂ |
| 6 | 4-CH₂CONH₂ | H | 7-CH₂Cl | 6-CH₂CONH₂ | H | C₆H₄—p-NHCOOCH₃ |
| 6 | 5-CH₂CONHCH₃ | C₄H₉—n | 7-C₆H₄—p-Br | 6-CONH₂ | C₂H₅ | CH₂CH₂CONH₂ |
| 6 | 4-CH₂CON(CH₃)₂ | H | H | 6-SO₂NH₂ | C₂H₅ | C₆H₄—p-CONHCH₃ |
| 6 | 4-CH₂CH₂SO₂NHCH₂CH₂OC₂H₅ | H | 4-COCH₃ | 6-SO₂NHCH₃ | CH₃ | C₆H₄—p-SCH₃ |
| 6 | 4-CH₂SC₂H₅ | H | 4-NO₂ | 6-SO₂N(C₂H₅)₂ | C₃H₇—n | CH₂CH₂SCH₃ |
| 6 | 5-CH₂SC₆H₅ | H | 4-Cl | 6-SO₃C₆H₅ | H | CH₂—C₆H₄—p-SCH₃ |
| 6,7 | 4-CH₂SO₂C₂H₅ | CH₃ | 4-CN | 6-SCH₃ | CH₃ | CH₂SO₂C₂H₅ |
| 6 | 2,4-di-CH₂SO₂C₆H₅ | CH₃ | 4-NHSO₂CH₃ | 6,8-di-SCN | H | CH₂SO₂Ph |
| 6 | 4-C₆H₃—o,p-di-CN | CH₃ | 7-CH₃ | 6-SO₂C₆H₅ | H | CH₂CH₂OSO₃K |
| 6 | 4-C₆H₂—o,m,p-tri-Cl | CH₃ | 7-OCH₃ | 6-CHO—8-CN | H | C₆H₄—p-OSO₃K |
| 6 | 2,6-di-OSO₃Na | CH₃ | 4-Ph | 6-CONHC₂H₅ | H | CH₂—(C₈H₄O₂N) |
| 6 | H | H | 7-CH₂(C₄H₄O₂N) | 6-CON(C₂H₅)₂ | H | C₂H₅ |
| 6 | H | H | 7-CH₂(C₄H₃O) | 6-C₆H₁₁ | H | C₂H₅ |
| 6 | 5-CH₂(C₈H₄O₂N) | H | H | 6-SC₆H₅ | H | C₂H₅ |
| 6 | 5-CH₂(C₄H₃O) | H | H | 6-NHSO₂C₆H₅ | H | C₂H₅ |

The invention has been described in detail with particular reference to preferred embodiments thereof, but it will be understood that variations and modifications can be effected within the spirit and scope of the invention.

I claim:

1. A dye having the structure:

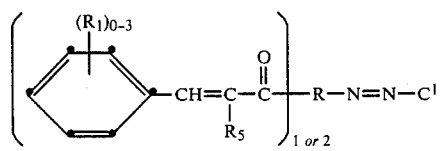

wherein R is a divalent radical of the formula

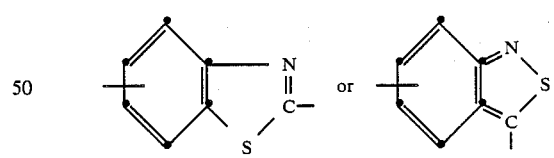

which may be substituted in any position not occupied by a cinnamoyl group with an R₁ group comprising alkyl, alkenyl of 2-6 carbon atoms, aryl, cyclohexyl, alkoxy, halogen, hydroxy, alkylsulfonyl, cyano, carbamoyl, alkanoyl, alkanoyloxy, aroyl, alkoxycarbonyl, sulfamoyl, alkylsulfamoyl, dialkylsulfamoyl, alkanoylamino, SO₃C₆H₅, alkylthio, thiocyano, arylsulfonyl, formyl, alkylcarbamoyl, dialkylcarbamoyl, NO₂, —SO₃M, —OSO₃M, —COOH, aryloxy, arylthio, alkylsulfonylamino, aroylamino, arylsulfonylamino, and cyclohexylthio, wherein each of the alkyl, alkenyl, aryl, and cyclohexyl moieties of the above groups, is unsubstituted or substituted with 1-3 substituents different from the said moiety and independently selected from alkanoyloxy, alkyl, alkenyl, succinimido, —NO$_2$, alkanoylamino, alkylsulfonylamino, 1-(2-pyrrolidono), halogen, cyano, alkoxy, aryl, cyclohexyl, hydroxy, —SO$_3$M, —OSO$_3$M, aryloxy, furyl, aroyloxy, alkoxycarbonyl, —SO$_2$N—(alkyl)$_2$, —NHCOO—alkyl, —NHCONH—alkyl, glutarimido, phthalimido, CONH$_2$, CONH—alkyl, CON(alkyl)$_2$, alkoxyalkoxy, alkylthio, arylthio, alkylsulfonyl, and arylsulfonyl, wherein M is selected from H$^+$, NH$_4^+$, Na$^+$, K$^+$, and the colorless cations of sulfuric acid or sulfonic acid salts of trimethylamine, triethylamine, tri(2-hydroxyethyl)amine, di(2-hydroxyethyl)amine, and N,N-dimethylaniline; and the coupler C$^1$ is selected from

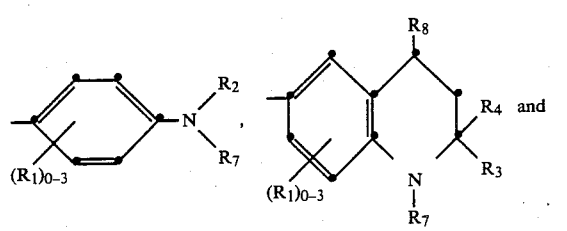

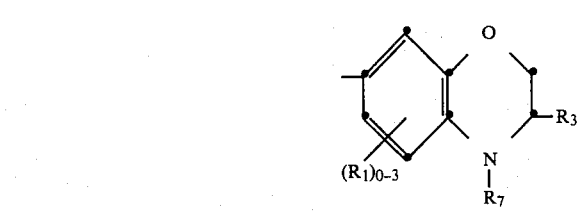

wherein R$_1$ is as defined above; R$_2$ and R$_7$ are each selected independently from hydrogen, alkyl, alkenyl of 2-6 carbons, aryl, and cyclohexyl, all of which groups are unsubstituted or substituted as defined above for the substituted R$_1$ groups; R$_3$, R$_4$ and R$_8$ are each selected from hydrogen and alkyl; and R$_5$ is H or alkyl.

2. A dye of claim 1 wherein the coupler C$^1$ is

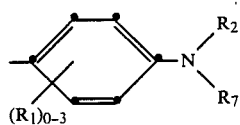

wherein R$_1$, R$_2$, and R$^7$ are as defined therein.

3. A dye of claim 1 wherein the coupler C$^1$ is

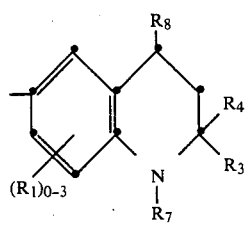

wherein R$_1$, R$_3$, R$_4$, R$_7$, and R$_8$ are as defined therein.

4. A dye of claim 1 wherein the coupler C$^1$ is

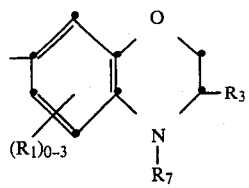

wherein R$_1$, R$_3$, and R$_7$ are as defined therein.

5. A dye according to claim 1 wherein the benzothiazole or benzisothiazole ring is unsubstituted or substituted with 1-3 substituents independently selected from methoxycarbonyl, β-hydroxyethylcarbamoyl, β-potassiosulfatoethylcarbamoyl, methylcarbamoyl, carbamoyl, ethoxycarbonyl, and methyl; the cinnamoyl ring is unsubstituted or substituted with 1-3 substituents independently selected from alkyl, aralkyl, aralkyl substituted with —SO$_3$M or —SO$_4$M, cyclohexylalkyl, cyclohexylalkyl substituted with —SO$_3$M or —SO$_4$, alkoxy, and alkanoylamino; R$_2$ is H, alkyl, aralkyl, aralkyl substituted with —SO$_3$M or —SO$_4$M, cyclohexylalkyl, cyclohexylalkyl substituted with —SO$_3$M or —SO$_4$M; R$_7$ is H, alkyl, aralkyl, aralkyl substituted with —SO$_3$M or —SO$_4$M, cyclohexylalkyl, cyclohexylalkyl substituted with —SO$_3$M or —SO$_4$M, sodio- or potassiosulfatoalkyl, sodio- or potassiosulfonicalkyl, or alkanoyloxyalkyl; the couplers are unsubstituted or substituted with 1-3 substituents independently selected from —SO$_3$M halogen, —SO$_4$M, alkyl, aralkyl, aralkyl substituted with —SO$_3$M or —SO$_4$M, alkanoylamino, aroylamino, cyclohexylalkyl, cyclohexylalkyl substituted with —SO$_3$M or —SO$_4$M, alkoxy, —COOH, and —OH; R$_3$, R$_4$ and R$_8$ are H or alkyl; and R$_5$ is hydrogen.

6. A dye according to claim 1 wherein: the cinnamoyl ring is unsubstituted or substituted with halogen, COOH, OH, or SO$_3$M; rings A and B are unsubstituted or substituted with methoxycarbonyl, β-hydroxyethylcarbamoyl, β-potassiosulfatoethylcarbamoyl, methylcarbamoyl, carbamoyl, ethoxycarbonyl, or methyl; and wherein, in an aniline coupler each substituent R$_1$ is a methyl, methoxy or acetamido group or a chlorine atom, each R$_2$ is hydrogen, a methyl or ethyl group, or a sulfonated cyclohexyl or benzyl group and each R$_7$ an ethyl or sulfonated ethyl group or an alkyl group of up to 4 carbon atoms substituted with a sulfonated phenyl group, each sulfonate group being of formula —SO$_3$M, and wherein in a tetrahydroquinoline coupler R$^1$ and R$^3$ are methyl groups, each of R$_4$ and R$_8$ is hydrogen or a methyl group, and R$_7$ is an ethyl group or a group of formula CH$_2$CH$_2$OCOCH$_3$ or CH$_2$CH$_2$OSO$_3$M.

7. The dye according to claim 1 having the formula

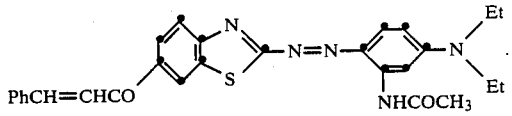

8. The dye according to claim 1 having the formula

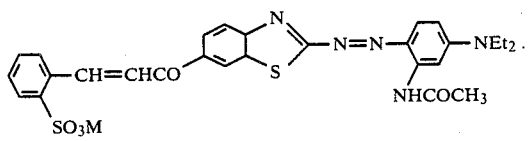

* * * * *